(12) United States Patent
Otsuka et al.

(10) Patent No.: US 7,079,283 B2
(45) Date of Patent: *Jul. 18, 2006

(54) PRINTING APPARATUS, PRINTING METHOD, DATA PROCESSING METHOD AND RECORDING MATERIAL

(75) Inventors: Naoji Otsuka, Yokohama (JP); Kiichiro Takahashi, Kawasaki (JP); Hitoshi Nishikori, Inagi (JP); Osamu Iwasaki, Tokyo (JP); Toshiyuki Chikuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 895 days.

This patent is subject to a terminal disclaimer.

(21) Appl. No.: 09/966,251

(22) Filed: Oct. 1, 2001

(65) Prior Publication Data

US 2002/0039192 A1 Apr. 4, 2002

(30) Foreign Application Priority Data

Sep. 29, 2000 (JP) ............................ 2000/300185

(51) Int. Cl.
*G06K 15/00* (2006.01)

(52) U.S. Cl. .......................... 358/1.9; 358/2.1
(58) Field of Classification Search ................ 358/1.9, 358/2.1, 2.99, 3.01, 3.02, 3.06, 3.07, 3.08, 358/3.09, 3.1, 1.13, 5.4, 1.11
See application file for complete search history.

(56) References Cited

U.S. PATENT DOCUMENTS

| 5,327,256 A | * | 7/1994 | Kang et al. ................. 358/445 |
| 5,852,454 A | | 12/1998 | Kanematsu et al. .......... 347/43 |
| 5,937,146 A | * | 8/1999 | Tateno et al. ................ 358/1.9 |
| 6,307,638 B1 | * | 10/2001 | Matsumoto ................ 358/1.12 |

* cited by examiner

*Primary Examiner*—Twyler M. Lamb
(74) *Attorney, Agent, or Firm*—Fitzpatrick, Cella, Harper & Scinto

(57) ABSTRACT

A data processing method for generating print data to be supplied to a printing apparatus capable of multi-value recording, includes a multi-value conversion step of converting obtained image data to multi-value print data; a binarizing step of converting the obtained image data to binary print data; and a selection step of selecting either one of the multi-value conversion step and the binarizing step in accordance with a condition.

21 Claims, 18 Drawing Sheets

PRINTING APPARATUS, PRINTING METHOD, DATA PROCESSING METHOD AND RECORDING MATERIAL

FIELD OF THE INVENTION AND RELATED ART

The present invention relates to a printing method and a printing apparatus, which are capable of carrying out a multi-value recording operation. It also relates to a data processing method for processing the data supplied to such a printing apparatus, and a storage medium for storing the data to be supplied to such a printer. In particular, the present invention relates to a bidirectional printing method, a bidirectional printing apparatus, a data processing method, and a storage medium, which make it possible to reduce the visibility of a streaky color deviation pattern, or nonuniformity in color, which occurs when an image is printed in color using a bidirectional printing method.

In the field of a printing apparatus, particularly an ink jet type printing apparatus, increase of a recording speed for color print is desired. To meet this desire, increase of the length of the recording head, increase of the frequency of actuation of the recording head, bi-directional printing are generally considered. The bi-directional printing is advantageous in that required energy is less concentrated than a unidirectional printing and is scattered in terms of time under the same throughput, and therefore, it is advantageous in the cost as a total system.

However, the bi-directional printing type is disadvantageous in that it involves an essential problem that order of deposition or application or shot of the inks of different colors are different between the forward direction of the main-scanning and the backward direction thereof, depending on the structure of the recording head, and therefore, color non-uniformity in the form of bands results. The problem arises from the order of the ink applications, and therefore, a difference in the coloring more or less appears when different color dots are overlaid with each other even slightly.

When an image is formed by ejecting coloring materials such as pigment or dye ink onto a printing material, the ink first applied first dyes the printing material from the surface layer to the inside of the printing material. When a subsequent dot ink is applied in the manner that it at least partly overlaps with the prior ink dot, the subsequent ink dyes more at a portion below the already dyed portion, and therefore, there is a tendency that resultant color has a first-color-rich nature. On the other hand, in the case that ejection nozzles for different colors are arranged in the main scan direction, the order of ink shots in the forward scanning operation is opposite from the order of the ink shots in the backward scanning operation. Therefore, the band color non-uniformity occurs due to the difference in the coloring.

The phenomenon occurs similarly in the case of wax type coloring material when a process color is formed due to the time difference, although the printing principles are different.

In the ink jet printer supporting the print, the problem is avoided using the following methods.

1) accept the color non-uniformity. Or, only black (Bk) is printed bi-directionally.

2) the nozzles for different colors are arranged in the sub-scan direction (so-called vertical arrangement).

3) the use is made with nozzles for forward path and nozzles for backward path, and the different nozzles or heads are used in the forward path and the backward path so that order of shots are the same.

4) the printing is effected such that rasters to be printed during the forward path and the backward path are interlaced, by which the frequency of the color non-uniformity due to the difference in the order of the shots is increased to provide visual uniformity.

SUMMARY OF THE INVENTION

However, the conventional technique 1) does not provide a fundamental solution, and the throughput is significantly lower when a color image is printed. 2) the shot orders are the same in the forward path and the backward path, but the length of the recording head is large, and another difference in the coloring occurs due to the time difference in the shots of different colors.

3) this is equivalent to use independent two sets of recording heads even if the recording heads for the forward path and the backward path are built in the same substrate, and therefore, a color non-uniformity due to large color difference in the form of bands attributable to the difference of the properties of different heads. For example, due to the difference in the data ratio of the forward path data to the backward path data, the temperature of the recording head may be different, there arises a difference in the ejection amounts between the recording heads, which would result in the color non-uniformity in the form of bands.

This is a significant problem in a single-path bi-directional printing. But, the same problem arises in the bi-directional multi-path printing, depending upon the difference in the number of dots to be recorded in the forward path and the number thereof in the backward path, the difference in the number of dots resulting from a thinning mask for supplying the data, or the difference in the number of dots to be print with synchronism with the printing raster.

4) this provide regularly high frequency color non-uniformity to visually hide the color non-uniformity, but the color difference may be stressed by interference, depending on the print data. For example, when the color difference is produced for each raster line, a large color difference results even if the same color is instructed, when there are a portion where the incidence is high on the even number rasters and a portion where the incidence is high on the odd number rasters in the forward path and the backward path due to half-tone process such as shading or the like.

On the other hand, a multi-value printer, which is capable of increasing the number of the levels in the gradation to produce an image with a smoother appearance, has been developed. To such a printer, multi-value data are supplied for effecting a larger number of levels in gradation. However, generation of multi-value data increases the load upon a host computer, and transfer of multi-value data increases the load upon an interface.

Thus, it takes longer time to generate and/or transfer data for image formation, increasing the printing time. Further, when a high speed printer, in particular, a multi-value printer capable of bidirectionally carrying out a single-pass recording operation is used, it sometimes becomes impossible to supply the printer with image formation data with sufficient speed, making it impossible to take advantage of the performance of a high speed multi-value printer.

The present invention was made to solve the above described problems, and its primary object is to provide a data processing method, a printing method, a printing apparatus, and a storage medium, which make it possible to generate and/or transfer image formation data with sufficient speed, while maintaining the load upon a host computer, an interface, and the like, at a proper level.

Another object of the present invention is to provide a data processing method, a printing method, a printing apparatus, and a storage medium, which are capable of reducing the probability of the occurrence of the streaky color deviation pattern, or nonuniformity in color, attributable to scanning direction, even when a color image is formed using a bidirectional printing method, and also are capable of generating and/or transferring image formation data while maintaining at a proper level the load upon a host computer, an interface, and the like.

According to an aspect of the present invention, there is provided a data processing method for generating print data to be supplied to a printing apparatus capable of multi-value recording, said method comprising a multi-value conversion step of converting obtained image data to multi-value print data; a binarizing step of converting the obtained image data to binary print data; and a selection step of selecting either one of said multi-value conversion step and said binarizing step in accordance with a condition.

According to another aspect of the present invention, there is provided a recording medium for storing a data processing program for generating print data to be supplied to a printing apparatus capable of multi-value recording, the improvement residing in that data processing program comprises a multi-value conversion step of converting obtained image data to multi-value print data; a binarizing step of converting the obtained image data to binary print data; and a selection step of selecting either one of said multi-value conversion step and said binarizing step in accordance with a condition.

According to a further aspect of the present invention, there is provided a printing apparatus capable of multi-value recording on the basis of multi-value print data supplied thereto, said apparatus comprising discriminating means for discriminating whether the data supplied to said printing apparatus is binary or not; bit converting means for converting, when the supplied print data are binary, the number of bits of the binary print data to the number of bits of the multi-value print data.

According to a further aspect of the present invention, there is provided a printing apparatus capable of forming a color image by application of different color inks onto a print medium while scanningly moving a recording head thereof bi-directionally, said apparatus comprising changing means for changing an order of application of the different color inks to be applied for formation of secondary color in a pixel area of secondary color; forming means for forming the secondary color while making the order of applications of the inks to at least one of a plurality of the secondary color pixel areas arranged along a raster scan direction different from the order of another, by said changing means; and bit converting means for converting, when the supplied print data are binary, the number of bits of the binary print data to the number of bits of the multi-value print data.

According to a further aspect of the present invention, there is provided a printing apparatus for forming a color image by application of different color inks onto a print medium while scanningly moving a recording head thereof bi-directionally, said apparatus comprising first forming means for changing an order of application of the different color inks to be applied for formation of secondary color in a pixel area of secondary color and forming the secondary color while making the order of applications of the inks to at least one of a plurality of the secondary color pixel areas arranged along a raster scan direction different from the order of another, by said changing means; and second forming means for changing an order of application of the different color inks to be applied for formation of secondary color in a pixel area of secondary color and forming the secondary color while making the order of applications of the inks to at least one of a plurality of the secondary color pixel areas arranged along a raster scan direction different from the order of another, by said changing means; and control means for forming the secondary color by said first forming means when the supplied print data are multi-value data, and forming the secondary color by said second forming means when the print data are binary data.

According to a further aspect of the present invention, there is provided a printing method capable of multi-value recording on the basis of multi-value print data supplied thereto, the improvement residing in the provision of a bit converting step of making, when the supplied print data are binary data, the number of bits of the binary print data provided by said binarizing step equal to the number of bits of the multi-value print data provided by said multi-value conversion step.

According to a further aspect of the present invention, there is provided a printing method capable of forming a color image by application of different color inks onto a print medium while scanningly moving a recording head thereof bi-directionally, said method comprising a changing step of changing an order of application of the different color inks to be applied for formation of secondary color in a pixel area of secondary color; a forming step of forming the secondary color while making the order of applications of the inks to at least one of a plurality of the secondary color pixel areas arranged along a raster scan direction different from the order of another, by said changing means; and a bit converting step of converting, when the supplied print data are binary, the number of bits of the binary print data to the number of bits of the multi-value print data.

With the provision of the above described structural arrangement, printing data can be generated in accordance with an image to be printed and/or a printing system used for printing the image to be printed. Therefore, it is possible to take full advantage of the performance of a printing apparatus without placing an excessive amount of load upon the system.

Further, even when an image is bidirectionally printed, the amount of the nonuniformity in color attributable to the order in which a plurality of inks different in color are deposited can be reduced.

Here, the "recording or printing material" includes paper used in a normal printer, textile, plastic resin material, film material, metal plate and the like which can receive ink.

Here, "ink or liquid" includes liquid usable with the "print" or "recording" defined above, and liquid usable to formation of an image, patter or the like on the printing material or to processing of the printing material.

The term "pixel area" means a minimum area where a primary color or secondary color is provided by application of one of more inks, and is not limited to a pixel but includes a super pixel or a sub-pixel. The number of scannings to complete the pixel area is not limited to one but may be plural.

The term "process color" includes secondary colors, and means a color provided by mixing three or more colors on the printing material.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The present invention concerns a printer having a controlling means for controlling a bidirectional image forming operation in such a manner that the probability that the order in which a plurality of primary inks different in color are deposited onto predetermined ink depositing positions of a recording medium, correspondent to the theoretical pixels of an image, the color of which are to be composed by a combination of a plurality of ink dots different in color, during the rearward scanning of the recording medium, becomes virtually reverse to the order in which the plurality of primary inks different in color are deposited onto predetermined ink depositing positions of the same recording medium, correspondent to theoretical pixels of the image, the color of which are to be composed by a combination of a plurality of ink dots different in color, becomes as high as possible (dominant), or in such a manner that a plurality of ink dots are deposited per pixel in order to always make reverse (symmetrical) the order in which the ink dots correspondent to each pixel are deposited during the rearward scanning of the recording medium, to the order in which the ink dots correspondent to the same pixel during the forward scanning of the recording medium. The present invention also concerns a host computer which generates binary data or multi-value data, in accordance with an image to be formed or a system to be used for image formation, and supplies a printer with such data. Regarding a printer structure for embodying the above described concept, it is desired that a plurality of recording elements for forming pixels (image), which are different in ink color, are aligned in the primary scanning direction.

Using such an embodiment, it is preferable that single-path print is carried out through bi-directional print by a symmetrical recording or printing head or that bi-directional multi-path print is carried out by the symmetrical head for bi-directional print or by a known head having recording elements for respective colors arranged in the main scan direction. But, the present invention is not limited to them.

Figure 3:
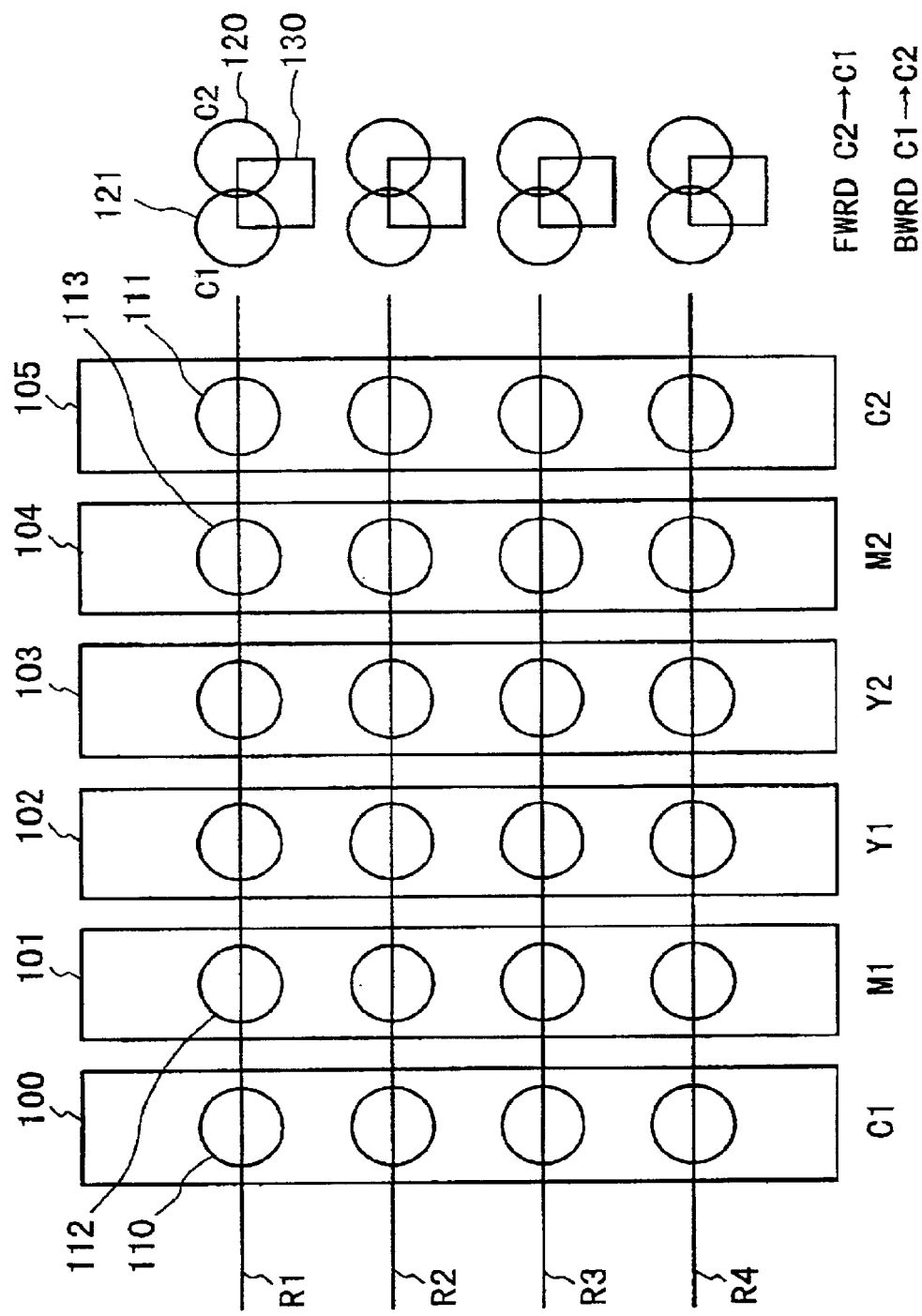
FIG. 3 shows an example of a recording head, an allotment of ejection nozzles and pixels according to an embodiment of the present invention.

Here, the symmetrical recording head usable with the bi-directional print is the recording head having the recording nozzles for the respective colors arranged in a symmetrical order at least in the main scan direction as shown in FIG. 3, and the inks are applied from the nozzles to the printing material such that order of shots for each color is symmetrical for each pixel.

When a process color including a secondary color is formed in a pixel using the recording head having such a structure, a plurality of ink droplets are applied from at least one of primary color nozzle, and the nozzles are arranged symmetrically both in the forward scanning and backward scanning directions (main scan direction), by which the differences in the coloring which has conventionally caused by the synchronism with configuration data such as lateral line or the like and by the difference in the shot order at the high density portion can be avoided. Furthermore, the color non-uniformity attributable to the bi-directional print caused by synchronism with half-toning using dither method or the like in the half-tone portion and the low density portion can be suppressed by the provision of control means for providing substantially equal incidence probabilities of orders of shots between the forward path print and the backward path print for the pixels to which a combination of different color dots are allotted.

Further, in this embodiment, in order to optimize the load which acts upon the data processing system of an image forming apparatus, whether the image formation data for an image to be formed are subjected to a binary half-toning process or a multi-value half-toning process is determined according to an image to be formed, an overall speed of a printing system, or the like. When a binary half-toning process is carried out, in order to make reverse the order in which one of the ink among the plurality of inks different in color is deposited onto a secondary color pixel to compose the secondary color, to the order in which another of the plurality of inks different in color is deposited onto the same pixel, at least the inks for forming the secondary color are deposited twice or more times. When the multi-value half-toning process is carried out, the process is controlled so that, as far as at least the pixels, the colors for which are composed of a combination of different colors (inks different in colors), are concerned, the probability that the order in which the plurality of inks different in color are deposited onto each pixel during the forward scanning movement of the recording head in terms of the primary scanning direction becomes virtually reverse to the order in which the plurality of inks are deposited during the backward scanning movement of the recording head in terms of the primary scanning direction, As for the factors on which the selection between the binary half-toning process and multi-value half-toning process is made, the following can be considered:
1) image type
2) system speed
3) a combination of image type and system speed.

In the case of a selecting method based on image type (1), bit map data, vector data, test data, or the like data format, can be considered as the factor on which the selection is made. Text data are for forming letters. In other words, text data effect areas solidly covered with ink. Thus, the need for converting text data into multi-value data is very small. In other words, in many cases, all that is necessary when generating text data, that is, printing data, with the use of a printer driver or the like, is to covert text data simply into binary data; there is no need for converting text data into multi-value data. It may be said that this is also true of vector data or the like, since vector data or the like also effect areas solidly covered with ink, like the areas of a graph, and therefore, multi-value data are unnecessary in many cases.

Generating multi-value data for an image, such as those listed above, which do not inherently need multi-value data, tend to overload the processing unit and/or memory of a host computer, and/or an interface or the like for transferring data from a host to a recording apparatus such as a printer, drastically reducing efficiency.

This embodiment is characterized in that the areas of an image, which do not inherently need multi-value data are represented by data having a smaller number of bits. It is assumed that a recording apparatus enabled to carry out a bidirectional recording operation, continuously and selectively in accordance with tone gradation data, employs a combination of a method for completing each pixel by placing a pair of ink dots and a method for completing each pixel by placing a single ink dot with the use of a distributing circuit. Therefore, when such a recording apparatus is employed, it becomes necessary to continuously generate multi-value data. Thus, in this embodiment, a switch is made between a process for generating multi-value data and a process for generating binary data, depending upon the type of image data. Although in this embodiment, a switch is made between a process for generating multi-value data and a process for generating binary data, the processes between which a switch is made does not need to be limited to these two processes; a switch may be made among a set of image formation data different in tone gradation, resolution, or the like.

Hereinafter, a case in which multi-value data with two bits, and a binary data with one bit, are employed, and a switch is made between them depending upon data type, will be described.

The description will be made as to the embodiments of the present invention. In the Figures, the same reference numerals are assigned to the elements having the corresponding functions.

Figure 1:
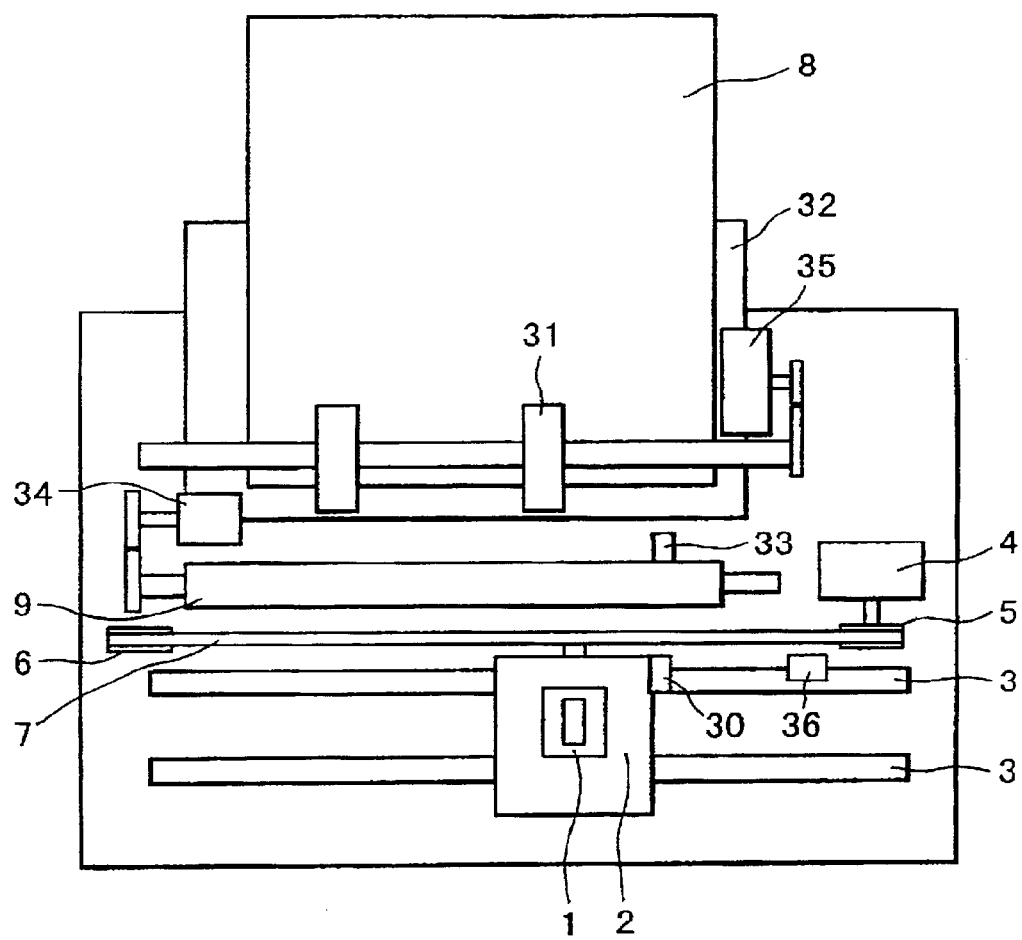
FIG. 1 shows a substantial structure of an ink jet printing apparatus according to an embodiment of the present invention.

FIG. 1 shows a structure of a major part of an ink jet printing apparatus according to an embodiment of the present invention.

As shown in FIG. 1, a cartridge 1 is exchangeably mounted on a carriage 2. The head cartridge 1 comprises a print head portion, an ink container portion and a connector portion for receiving and supplying signals for driving the head portion (unshown).

The head cartridge 1 is carried on the carriage 2 at a correct position and is exchangeable, and the carriage 2 is provided with a connector portion and a holder (electrical connecting portion) for transmission of the driving signals or the like to the head cartridges 1 through the connector.

The carriage 2 is reciprocably supported and guided by a shaft 3 and a guide of the main assembly of the apparatus, which is extended in a main scan direction. The carriage 2 is driven through a driving mechanism such as a motor, a pulley 5, a driven pulley 6, a timing belt 7 or the like by a main-scanning motor 4, and the position and the movement are controlled. A home position sensor 30 is carried on a carriage. By this, the position of the carriage 2 can be detected when the home position sensor 30 of the carriage 2 passes by the shielding plate 36.

The print mediums 8 in the form of a print sheet, thin plastic resin sheet or the like are fed out one by one from the automatic sheet feeder ("ASF") by rotating the pick-up roller 31 through a gear by a sheet feeding motor 35. By rotation of the feeding roller 9, the sheet is fed through (scanned by) a position (print portion) where the sheet is opposed to the ejection outlets of the head cartridge 1. The feeding roller 9 is rotated through the gear by rotation of the LF motor 34. At this time, the discrimination of the sheet feeding and the determination of the leading edge of the sheet is effected by the timing at which the print medium 8 passes by the paper end sensor 33. The paper end sensor 33 is also effective to detect the actual position of the trailing edge of the print medium 8 and to make the final determination of the current recording position.

The print medium 8 is supported by a platen (unshown) at its back side so as to provide a flat print surface at the print portion. The heads and cartridges 1 on the carriage 2 are supported such that ejection side surfaces thereof are faced downward in parallelism with the print medium 8 between the feeding rollers constituting a pair.

The head cartridge 1 is an ink jet head cartridge which ejects the ink using the thermal energy, and is provided with electrothermal transducers for generating thermal energy. In this example, the print head of the head cartridge 1 ejects the ink through the ejection outlet using the pressure of the bubble generated by film boiling caused by the thermal energy applied by the electrothermal transducer. Another type using a piezoelectric element to eject the ink, or the like is usable.

Figure 2:
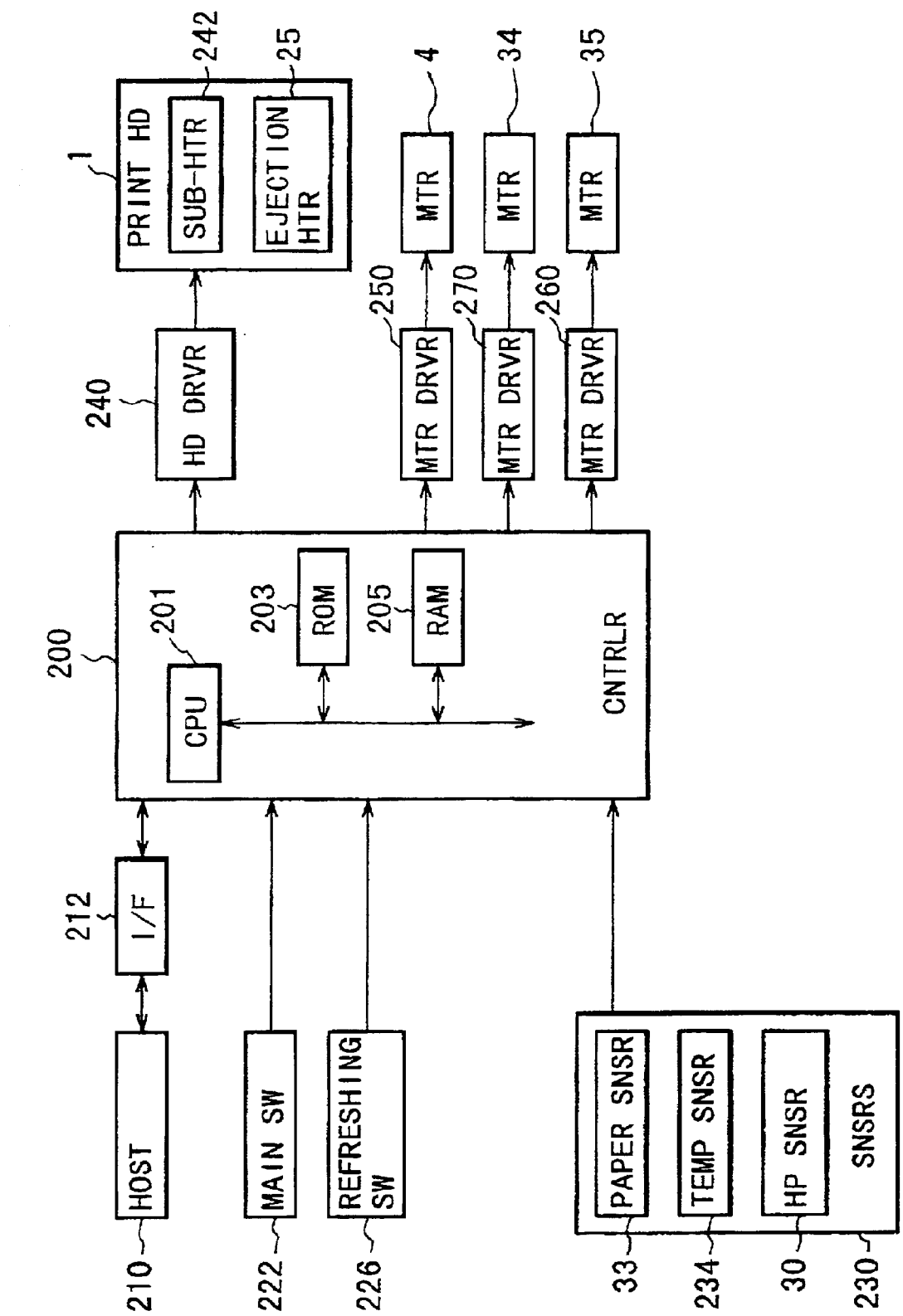
FIG. 2 is a block diagram of a control circuit for a printing apparatus.

FIG. 2 is a block diagram of a control circuit in the ink jet printing apparatus.

In these Figure, a controller 200 is a main controller, and comprises a CPU201 (a micro computer or the like), ROM203 storing a program, a table, fixed data or the like, and RAM205 having an area for conversion of image data and a wording area. The host apparatus 210 may be a supply source of image data (a computer for carrying out production and processing of data such as image to be printed, or a reader portion for reading the image to be printed, or the like). The image data, command, a status signal or the like are transmitted to and from the controller 200 through the interface (I/F) 212.

The operating portion 120 includes a group of switches for actuation by the operator, and includes a main switch 222, a recovery switch 226 for instructing the start of the suction refreshing operation.

A group of sensors includes sensors for detecting states of the apparatus, more particularly, the above-described home position sensor 30, a paper end sensor 33 for detecting presence or absence of the print medium and a temperature sensors 234 or the like disposed at proper positions for detecting the ambient temperatures.

The head driver 240 is a driver for actuating the ejection heater 25 of the print head 1 in accordance with the print data. The head driver 240 includes a shift register for aligning the print data corresponding to the positions of the ejection heater 25, a latching circuit for effecting latching at proper timing, a logic circuit element for actuating the ejection heaters in synchronism with the drive timing signal, and a timing setting portion for appropriately setting the drive timing (election timing) for dot formation and position alignment, or the like.

The print head 1 is provided with a sub-heater 242. The sub-heater 242 functions for temperature adjustment for stabilizing the ink ejection property, and may be formed on the print head substrate simultaneously with the formation of the ejection heater 25 or may be mounted on the head cartridge or on the main body of the print head.

The motor driver 250 functions to actuate the main-scanning motor 4, and a sub-scan motor 34 functions to feed the print medium 8 (sub-scan), and the motor driver 270 is a driver therefor.

The sheet feeding motor 34 is a motor for separating and feeding the print medium 8 from the ASF, and the motor driver 260 is a driver therefor.

(Embodiment 1)

FIG. 3 is a partial schematic view of a major part of a recording head portion of a head cartridge 1. In this Figure, designated by 100 is a first recording head for ejecting cyan ink (C1). Designated by 101 is a first recording head (M1) for first recording heading magenta ink (M1).

Designated by 102 is a first recording head for ejecting yellow ink (Y1). Designated by 103 is a second recording head (Y2) for ejecting yellow ink. Designated by 104 is a second recording head (M2) for ejecting magenta ink. Designated by 105 is a second recording head (M2) for ejecting cyan ink. Additionally, a recording head for ejecting Bk ink may be used, too.

The head cartridge 1 is constituted by such said recording heads.

In head cartridge 1, each of the recording heads includes a plurality of ejection nozzles. For example, the recording head 100C1 includes cyan ejection nozzles 110. The recording head 101M1 includes magenta ejection nozzles 112. The recording head 104M2 includes magenta ejection nozzles 113. The recording head 105C2 includes cyan ejection nozzles 111.

The nozzles of each of the recording heads is arranged in a direction perpendicular to the main scan direction. Strictly, they may be slightly inclined relative to the main scan direction in consideration of the ejection timing. The recording heads are arranged in the same direction as the main scan direction. More particularly, in the case of FIG. 2 example, each of the recording heads 100C1, 101M1, 102Y1, 103Y2, 104M2 and 105C2 is arranged in the same direction as the main scan direction.

The dot position 121 and the dot position 120 in this Figure, are the positions allotted for the dot provided by the ejection nozzle 110 of the recording head 100C1 and the dot provided by the ejection nozzle 111 of the recording head 105C2, both for area of the pixel (picture element) 130. In this example, the dot position 120 is located on the upper right position of the diagonal line, and the dot position 121 is located on the upper left position. Designated by R1–R4 are main-scanning line for the pixels, namely, raster lines. Here, 1 pixel is provided by 1 raster namely 1 scanning.

In the example shown in FIG. 3, the primary cyan color is printed a maximum density on the pixel. For the one pixel 130, a pair of dots are printed at the dot position 120 and the dot position 121. In this example, in a forward path in which the head cartridge 1 moves in the direction indicated by the arrow in the Figure, the order of the dots printed for the pixel 130 is C2 and then C1 provided by the recording heads 105C2 and 100C1, and in the backward path, the order is C1 and then C2. In the case of the primary color, the color of the inks are the same, so that there occurs no coloring difference depending on the difference in the order of print.

Figure 4:
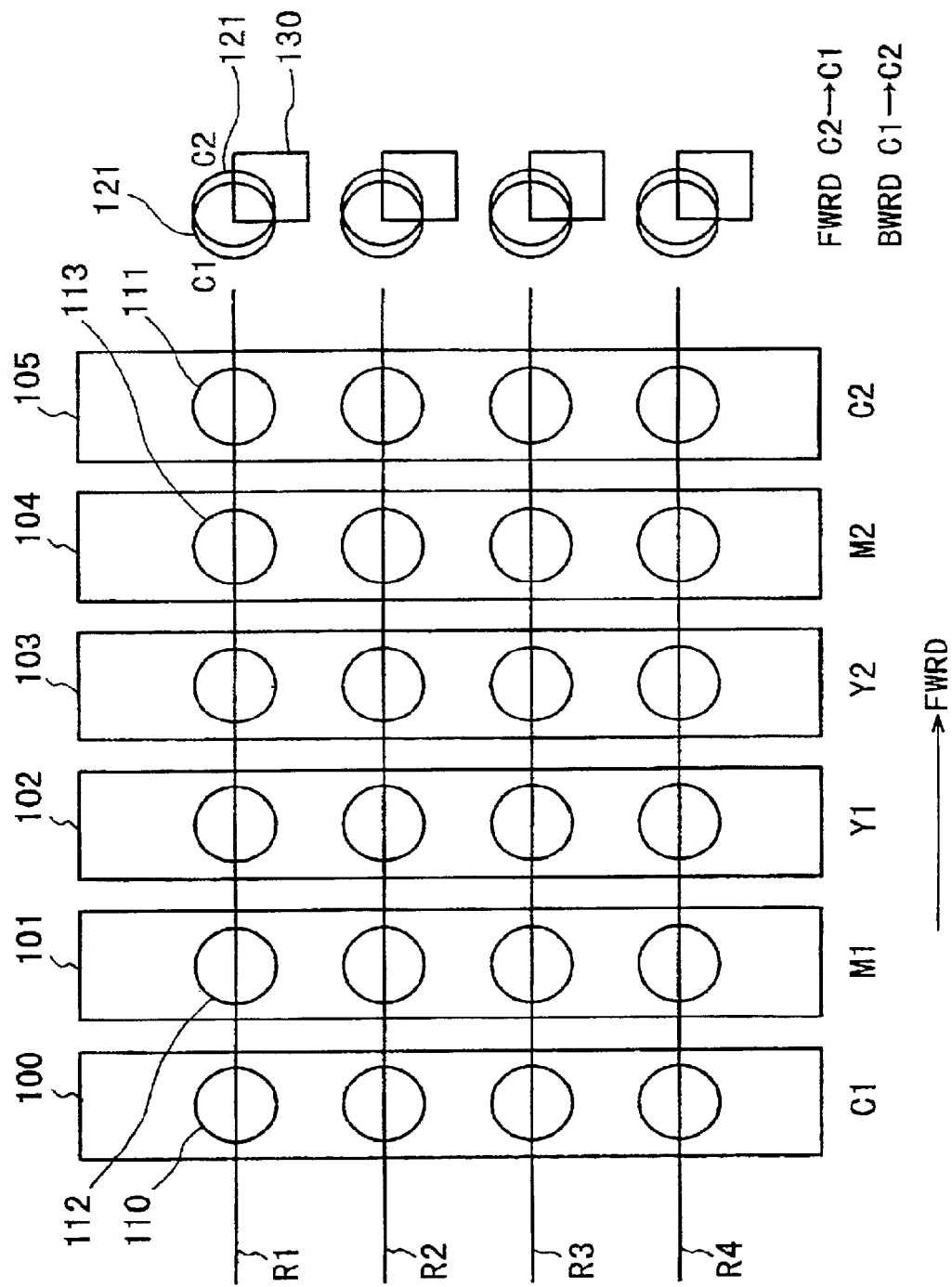
FIG. 4 shows a further example of a recording head, an allotment of ejection nozzles and a pixel.

FIG. 4 shows an example in which the pixel is printed by two dots at the dot position 121 of the pixel 130 at the maximum density using the head cartridge 1 having the same structure as FIG. 3.

What is different from FIG. 3 is that dots are overlaid (dot-on-dot, that is, the centers of gravity are substantially aligned), and therefore, the coloring of the prior dot is stronger. However, the color is the primary color in this example, and the colors are the same, there occurs no coloring difference between the forward path printing and the backward path printing.

Figure 5:
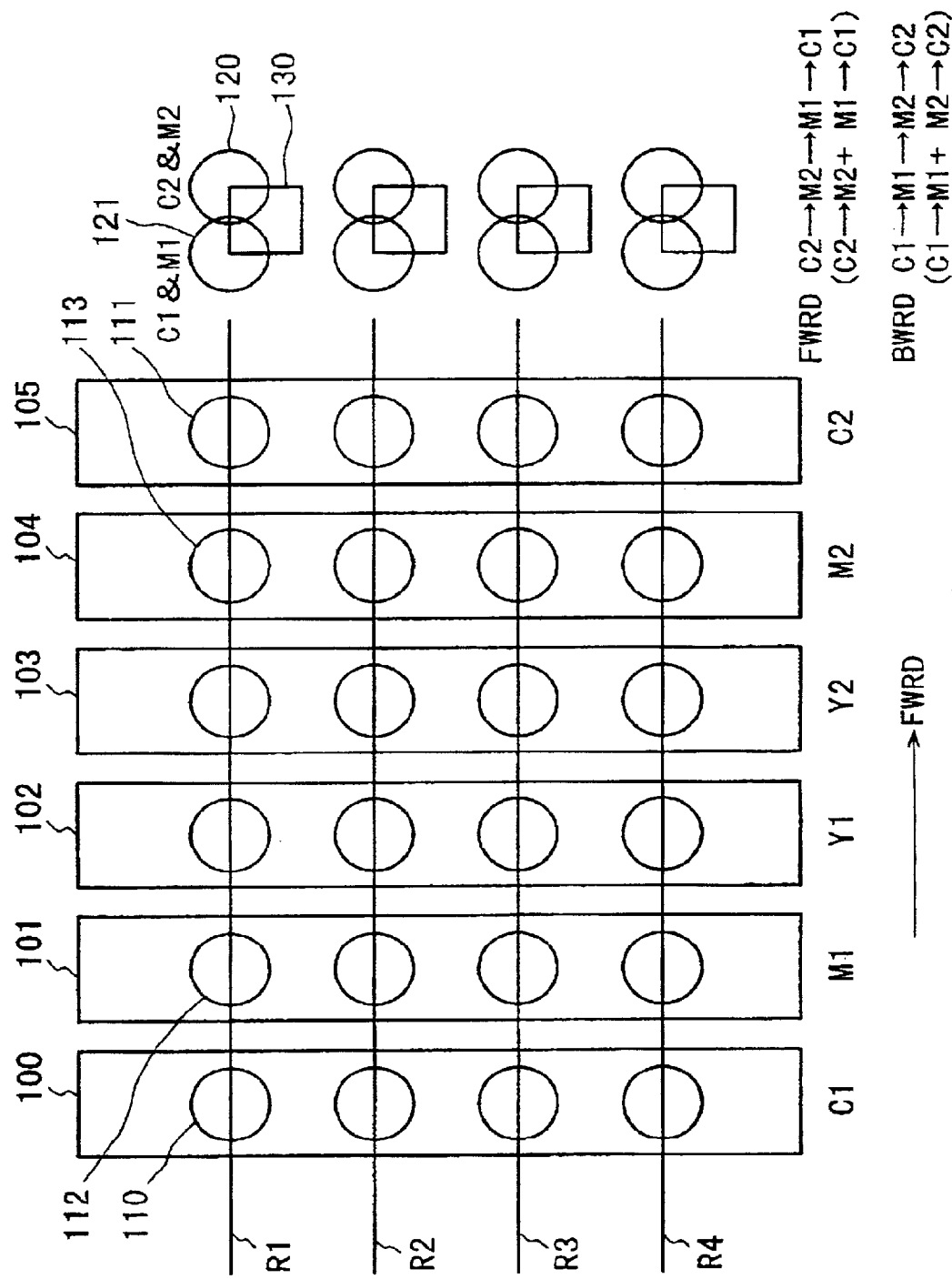
FIG. 5 shows a further example of a recording head, an allotment of ejection nozzles and a pixel.

FIG. 5 shows an example in which the use is made with the head cartridge 1 having the same structure as with FIG. 3, cyan and magenta dots are printed to the pixel 130 at the maximum density at the positions 120, 121. As is different from the pixel 130 of FIG. 3, the inks of the different colors are printed dot-on-dot in each pixel. The blue color (secondary color) is provided by cyan and magenta. The dot position 121 receives the ink from the magenta ejection nozzle 112 of the recording head 101M1 in the forward path, and then receives the ink from the cyan ejection nozzle 110 of the recording head 100C1. From the above-described principle, the color of the first ink (magenta in this case) normally tends to be dominant, that is, the color is relatively closer to the burgundy color, at the dot position 121.

Similarly, the dot position 120 receives ink from the cyan ejection nozzle 111 of the recording head 105C2 in the forward path and receives ink from the magenta ejection nozzle 113 of the recording head 104M2. From the above-described principle, the color of the first ink (magenta in this case) normally tends to be dominant, that is, the color is relatively closer to the violaceous color, at the dot position 120.

The print in the backward path will be considered. The ink from the cyan ejection nozzle 110 of the recording head 100C1 and the ink from the magenta ejection nozzle 112 of the recording head 101M1 are printed in this order. The color of the first ink (magenta in this case) normally tends to be dominant, that is, the color is relatively closer to the violaceous color, at the dot position 120. Similarly, in the backward path, the dot position 120 receives the ink from the magenta ejection nozzle 113 of the recording head 104M2, and then receives the ink from the cyan ejection nozzle 111 of the cyan. The color of the first ink (magenta in this case) normally tends to be dominant, that is, the color is relatively closer to the burgundy color, at the dot position 120.

In this manner, the blue relatively closer to burgundy (burgundy blue) and the blue relatively closer to violaceous (violaceous blue) are always appear as a pair. Microscopically, the differently colored dot columns appear alternately. When this is seen on the pixel 130 macroscopically, the order of shots (applications) of the ink is the cyan dot from C2, the magenta dot from M2, the magenta dot from the M1 and the cyan dot from C1 in the backward path, and is the cyan dot from C1, the magenta dot from M1, the magenta dot from M2, cyan dot from C2. The order is symmetrical in the pixel. Therefore, in the single pixel, the intermediary blue color can be uniformly provided.

In this invention, when the maximum density is to be provided at a pixel, it is dominant that colors constituting a secondary color for a pixel are symmetrically printed for the pixel. In this example, the blue color (cyan and magenta) is taken as the secondary color, it will be readily understood that present invention is applicable to the red (magenta and yellow) and to the green (cyan and yellow). Moreover, it will be also readily understood that in the case of a process color, that is, tertiary color, and the similar effects can be provided when the colors are symmetrically printed.

Figure 6:
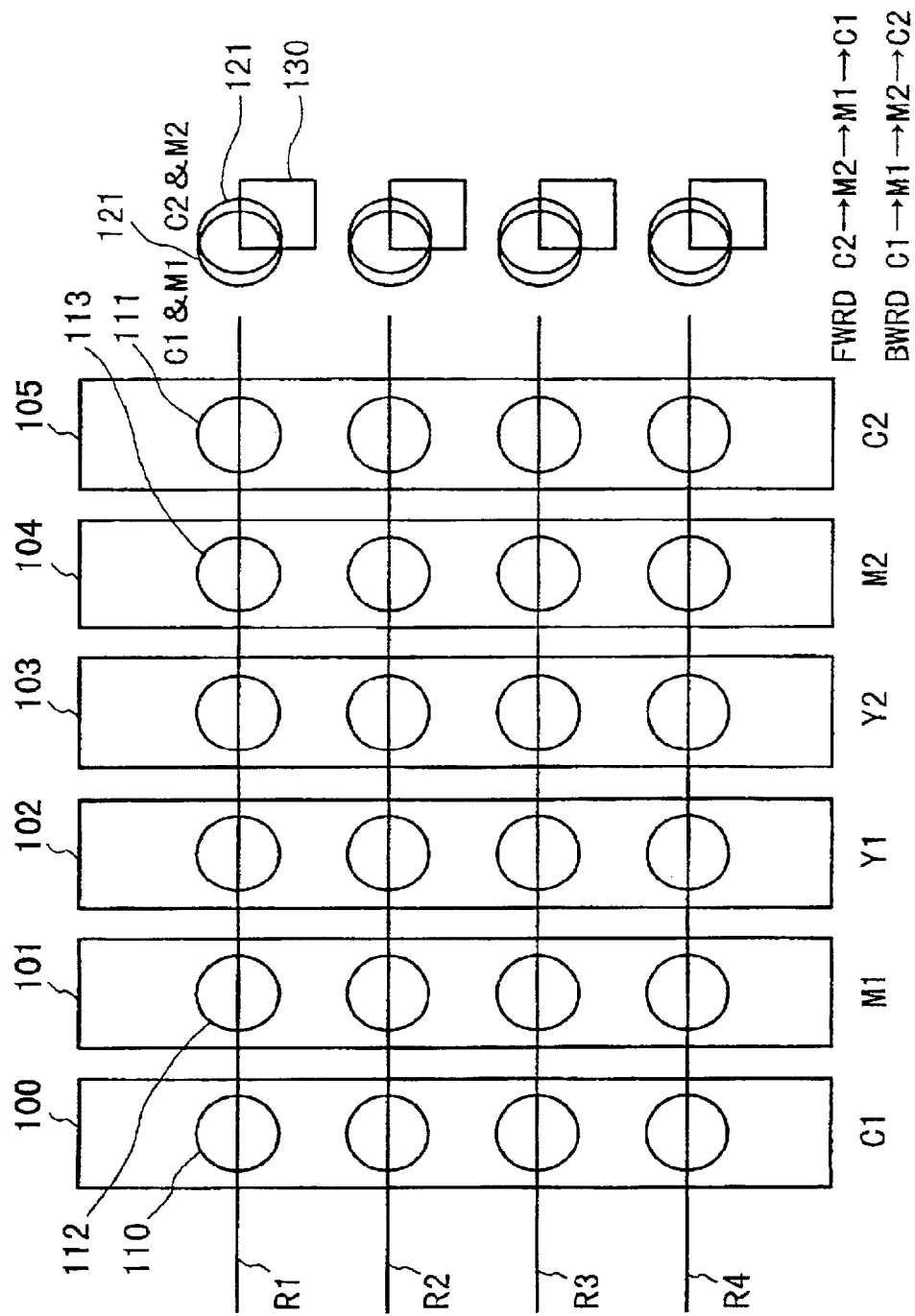
FIG. 6 shows a further example of a recording head, an allotment of ejection nozzles and a pixel.

FIG. 6 shows an example in which the use is made with the head cartridge 1 having the same structure as with FIG. 3, and the cyan and magenta dots are allotted to the dot position 121 on the pixel 130.

In this case, almost all of the different color inks are printed dot-on-dot for the pixel structures.

At the dot position 121, the order of the printing action in the forward path is such that dot from the cyan ejection nozzle 111 of the recording head 105C2, the dot from the magenta ejection nozzle 113 of the recording head 104M2, the dot from the magenta ejection nozzle 112 of the recording head 101M1, the dot from the cyan ejection nozzle 110 of the recording head 100C1 on the print medium. In the backward path, the cyan dot from C1, the magenta dot from M1, the magenta dot from M2, the cyan dot from C2 in a symmetrical pixel structure. Therefore, the blue coloring is more uniform in each pixel.

Again, when the maximum density is to be provided at a pixel, it is dominant that colors constituting a secondary color for a pixel are symmetrically printed for the pixel.

Figure 7:
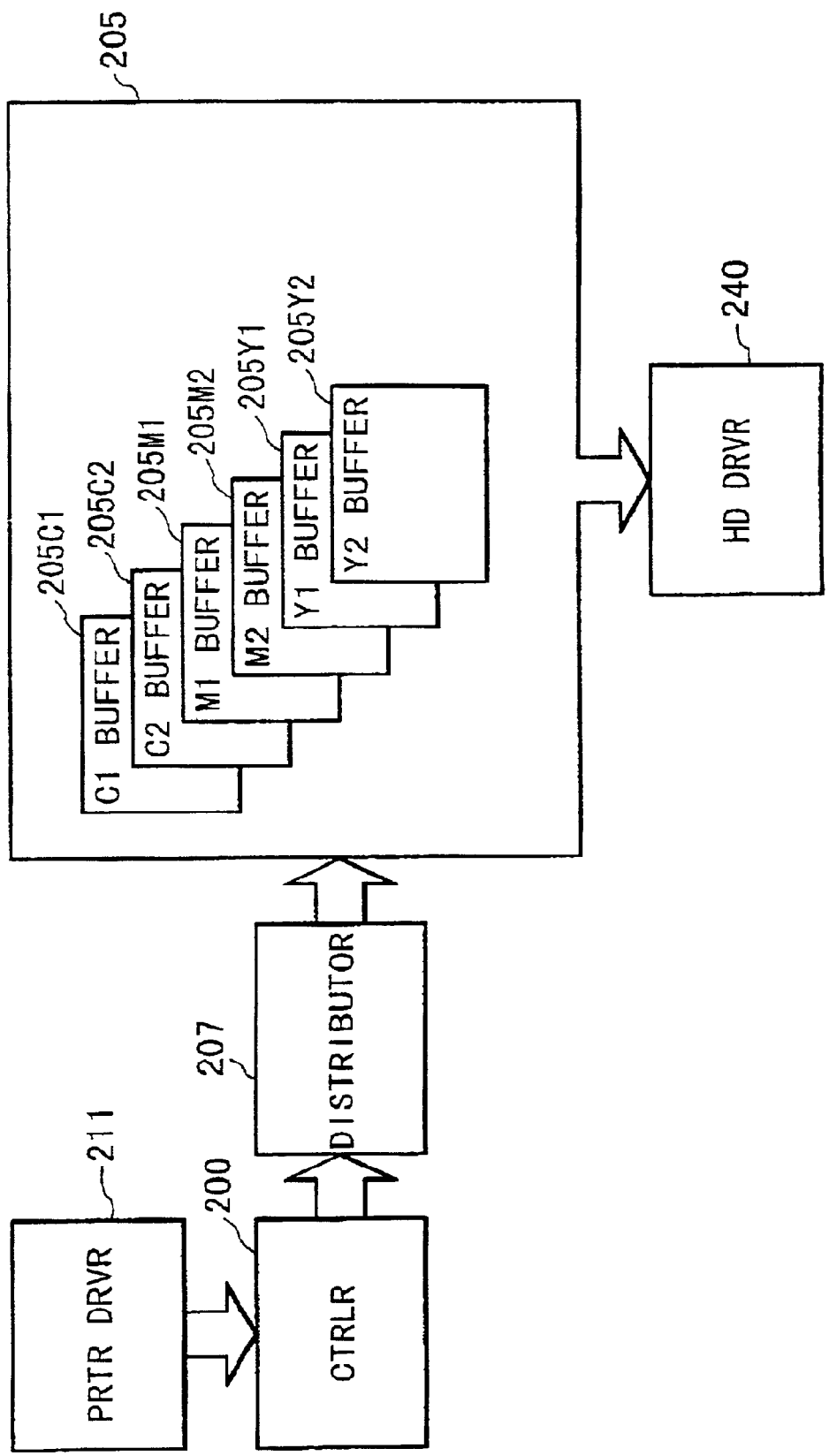
FIG. 7 is a block diagram of a buffer structure for print data according to an embodiment of the present invention.

FIG. 7 shows a data buffer structure of the printing apparatus according to this embodiment.

Figure 9:
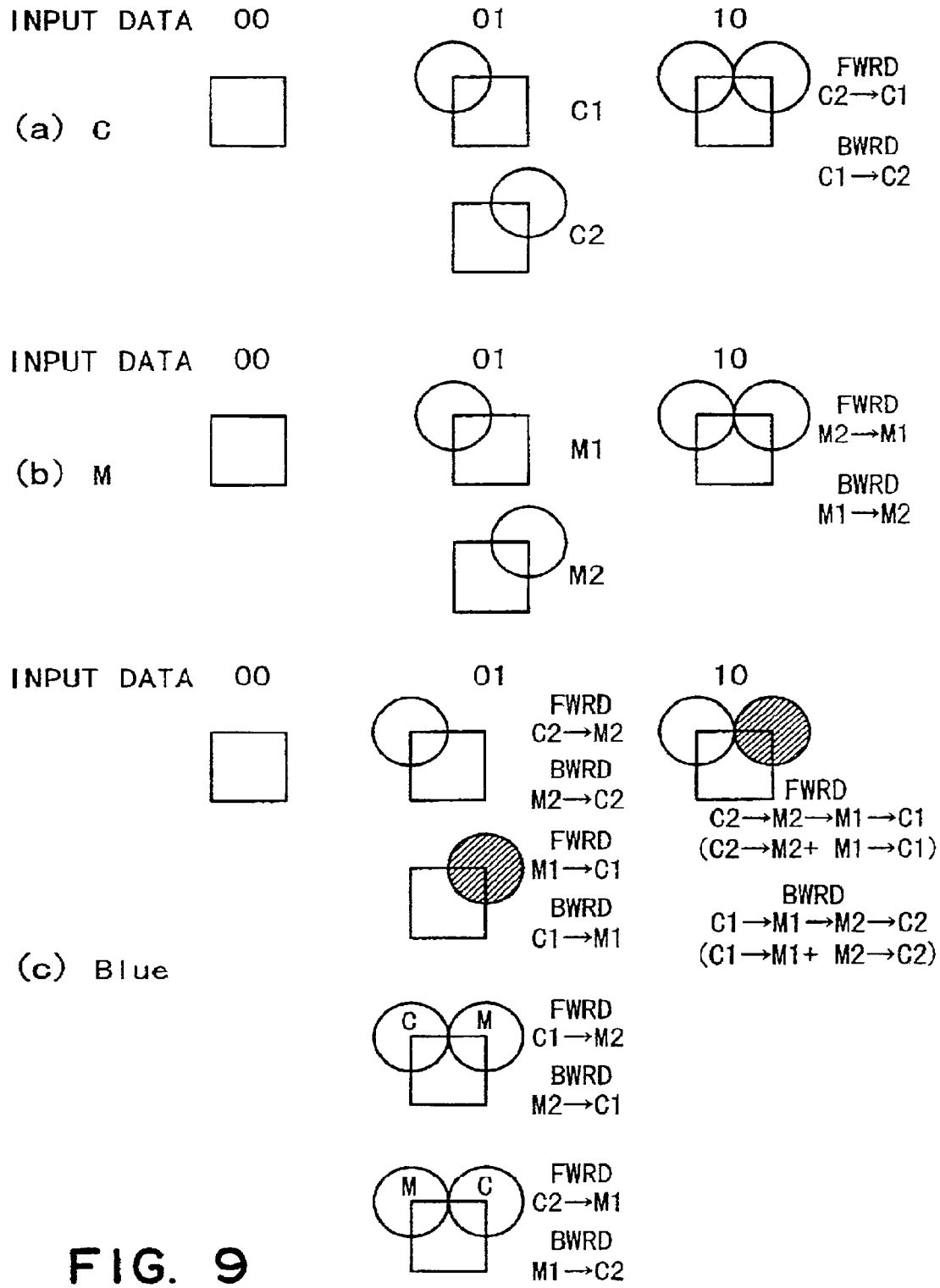
FIG. 9 shows a relation between input data and dot positions, used in Embodiment 1.

In this figure, a printer driver 211 is actuated by a program for generating image data in a host apparatus 210 and for supplying the generated data to the printing apparatus. The controller 200 converts the image data supply from the he printer driver 211 if necessary and distributes them as 2 bit data for each color (CMY). The distribution circuit 207 write the data for each of CMY colors in the print buffer 205 in accordance with a correspondence table as shown in FIG. 9 which will be described hereinafter.

Figure 8:
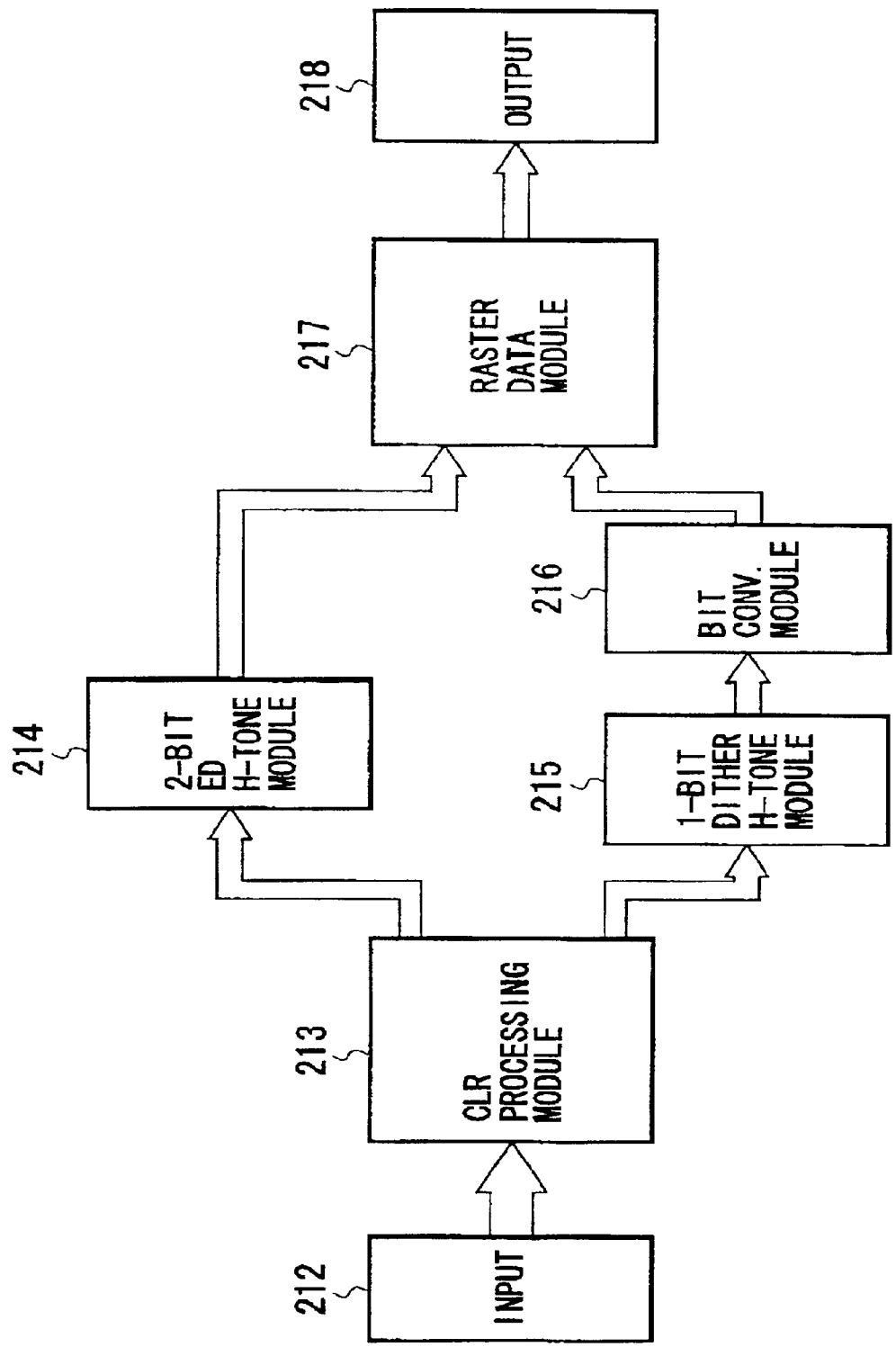
FIG. 8 is a block diagram for showing in detail the function of the print driver in accordance with the present invention.

The functions of the printer driver 211 are shown in FIG. 8, in the form of a block diagram. As has been known, a printer driver is a program, which is stored in a storage medium, for example, an FD, CD-R, or the like, and can be carried out by being installed in a host computer.

In this embodiment, the printer driver 211 subjects the data received from an input module 212 to color related processes, such as color changing or masking, with the used of a color processing module 213. More specifically, bit map data are subjected to a half-toning process so that they becomes multi-value data, which are two bit data in this embodiment. The conversion is carried out by a two bit ED half-toning module 214.

On the other hand, test or vector data are put through a half-toning process by a one bit-dithering-half-toning module 215, being turned into binary data, that is, one bit data. From the standpoint of processing speed, a systematic dithering or the like, which is high in processing speed, is effective for processing text data or vector data. After being converted into single bit data, text or vector data are put through a bit conversion module 216 (one bit to two bit) to alter their format so that the format becomes the same as that of two bit data used for bit map data. After being put through the above half-toning processes, they are combined with the raster data, and then are outputted from an output module 218.

In the bit conversion module 216, a one bit datum "0" is converted into "00", and a one bit datum "1" is converted into "10", which represents the maximum density. The details will be described later.

For example, 2 bit data are written for the cyan color. In the type of the embodiment, when the density is the maximum, 1 bit data is written in the buffers 205C1, 205C2 for the recording heads 100C1 and 105C2, respectively. When the recording heads reach the predetermined positions for the recording for the pixels, the data in the buffer are read in the registers in the recording heads to effect the printing operations. By such data and the buffer structure, the printing can be effected on the sub-pixels from the different recording heads, for the 2 dot pairs. Here, the CMY is taken, but the same applies to the case of CMYK, to the case of light and dark inks or other colors.

The print buffers 205C1, C2, M1, M2, Y1, Y2 are provided in the RAM205.

Heretofore, the description has been made as to the case of reproducing the maximum density for each of the pixels. Now, the bi-directional print for reproducing the half-tone in a pixel will be described. Here, a specific example will be described in which multi-value data are received.

In this embodiment, bit map data are described regarding a case in which three-value data (the number of dots is 0, 1, or 2) for each one component color corresponding to each color are converted into such data that each component color is represented by two bit data, unless specifically noted. The number of bits is not limited to 2 bit, but may be 4 bit or the like. Furthermore, even when the 2 bit data are used, only two of their values may be used. Particularly, the bit number is determined in view of the relation between the recording resolution and the dot diameter from the standpoint of the design philosophy of the degrees of the toner gradation for each pixel and the maximum density. The present invention is usable with any of them.

When the half-toner is reproduced in a pixel, the 2-dot pair cannot be allotted in the pixel, since the 2-dot pair expresses the maximum density (since the allotment of the 2-dot pair results in the maximum density). In the embodiment of present invention, in the case of the half-toner not allotting the dots in the 2-dot pair fashion, each color may be contain only one dot. Therefore, when the secondary color is reproduced using the forward path and the backward path, the problem stemming from the penetration difference of coloring may arise because of the principle described in the introductory part of the specification.

In this embodiment, the control is effected such that occurrence probabilities of pixels in which the order of shots or deposition of the colors are different are substantially the same in the forward path and in the backward path, by which the coloring as seen macroscopically is the same in the forward path and the backward path. In this embodiment, the recording head is such that nozzles for each color provide a symmetrical order of shots with respect to the main scan direction to switch the order of shots in the recording scan. The order of shots can be changed in one main recording scan by dot allotment to a selected one of the recording nozzle of the two recording nozzles for the same color arranged in the main scan direction.

FIG. 9 shows the relationship between the inputted multi-value data and allotted dots. FIG. 9, (a) shows a relation of allotment between the input data to the cyan (C) and the dot. No dot is allotted to the cyan data 00. For the data 01, the distribution circuit 207 for storing the data in the print buffer 205C1 shown in FIG. 7, stores the data in the print buffer 205C2 such that incident probabilities are substantially uniform. The dot arrangement for the data 01 is either one of those shown in the Figure (a) at 01.

For the data 10 providing the maximum density, two dots are allotted, and therefore, the data are allotted to the print buffers 205C1, 205C2, respectively in FIG. 7, so that dot arrangement is as shown in the Figure, (a) at 10.

In the Figure, (b), a positional relationship between the magenta (M) input data and the dot allotment, but the detailed description will be omitted since it is substantially the same as the case of cyan color.

The Figure, (c) shows a positional relationship between the input data for the blue (secondary color) and the positions of the dots. In the case of the primary color (cyan and magenta) described above, no concentration is necessary to the order of shots, because there occurs no difference in coloring. However, in the case of the secondary color, the order is to be considered since otherwise the difference occurs in coloring.

In the Figure, (c), the input data are shown as for the blue color, and actually, the uniform signal levels or values 00, 01, 10 are supplied for the cyan and magenta colors.

For the input data 00, no dot is allotted. For data 01, there are four types as shown in the Figure, (c). For the data 01, the dot arrangements are determined by the result of distribution of the distribution circuit 207 for C, M colors respectively, there are four types of arrangement in each of the forward and backward paths. In the simplest system, the data 01 may be reproduced simply with the four combinations.

In such a case, the distribution may be alternating (sequential) distribution of the data to the plurality of (two, here) to the buffers or may be random distribution. What is desired is that orders of ink applications are not one-sided. More desirably, the incidences are fifty-fifty for the above-described reasons.

When it is desired that spatial frequency is raised by reducing the intervals between the dots in an image so as to reduce the roughness of the image, that complete overlap of the dots is avoided or that non-uniformity in the form of stripes, the distribution circuit 207 may effect the distribution on the basis of checking of the appearances of CMY so as to avoid the overlapping of the dots.

In the case of the data 10, the respective combinations can be provided in each of the forward path and the backward path, but, as described in the foregoing, for each of the pixels, the order of shots is the same, and therefore, the same coloring can be provided.

With FIG. 9, the description has been made with respect to the dot allotment for the cyan and magenta colors and blue color which is a secondary color provided by them, the same applies to the yellow and the other secondary color (green and red).

Figure 10:
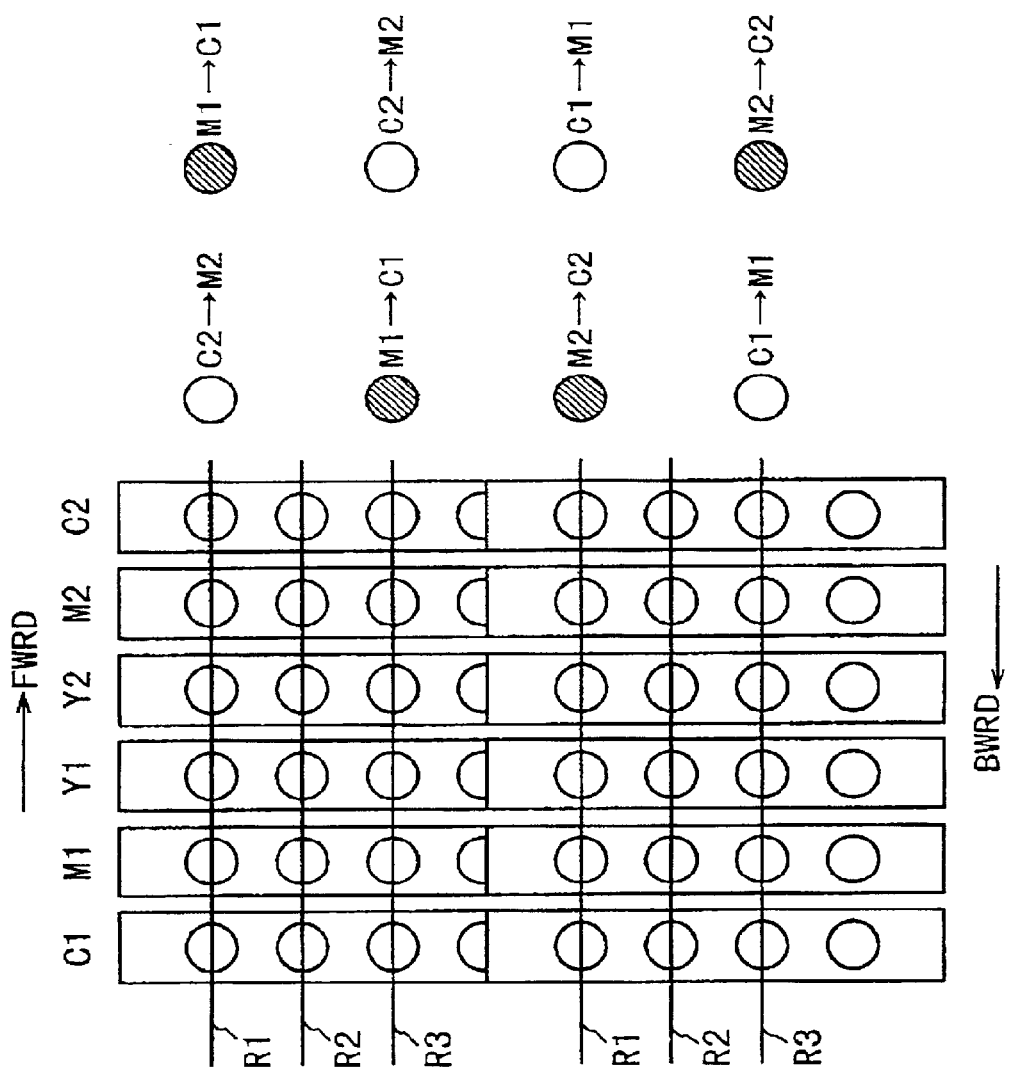
FIG. 10 shows a state in which a low density portion is printed in Embodiment 1.
Figure 11:
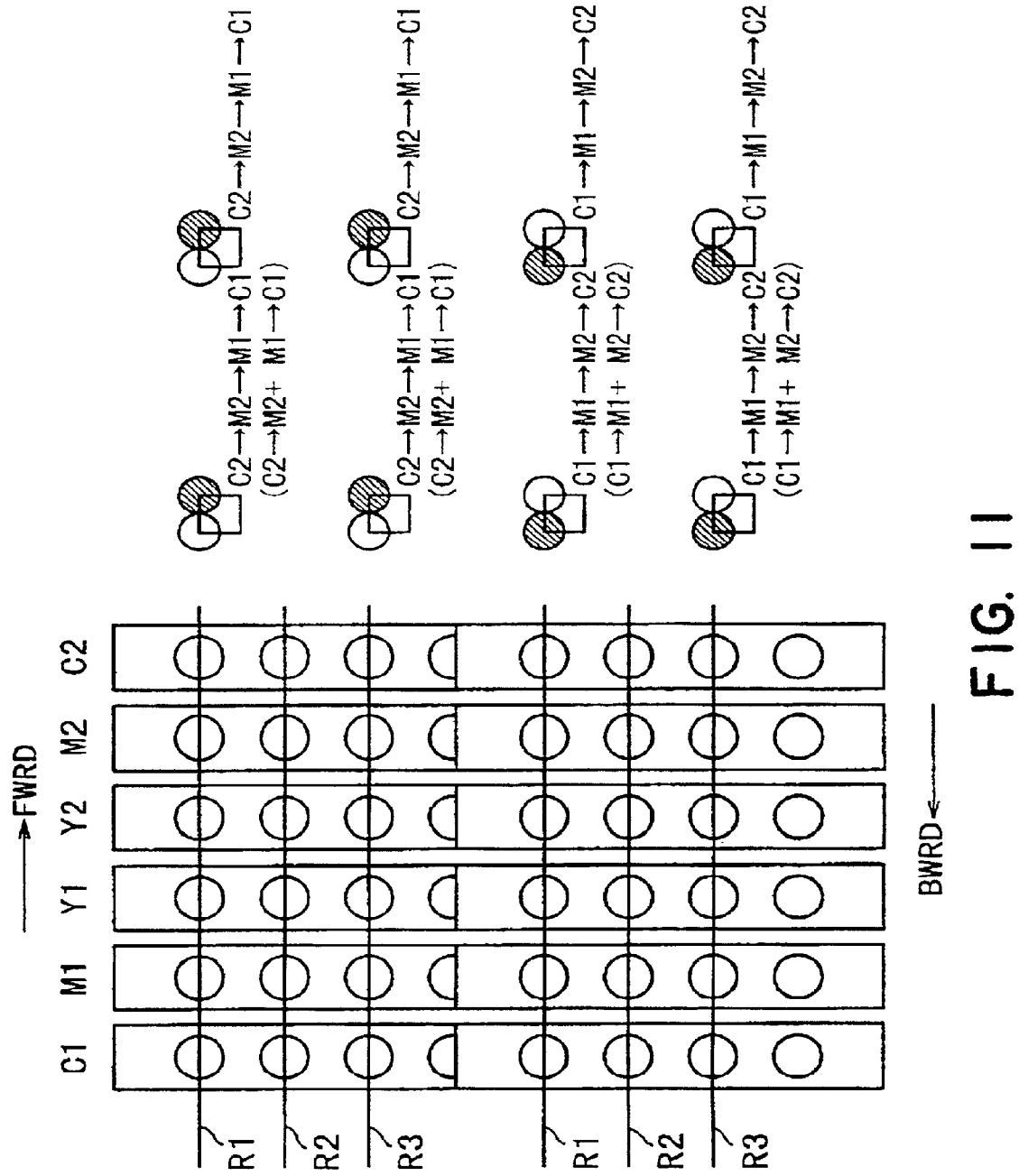
FIG. 11 shows a state in which a high density portion is printed in Embodiment 1.
Figure 12:
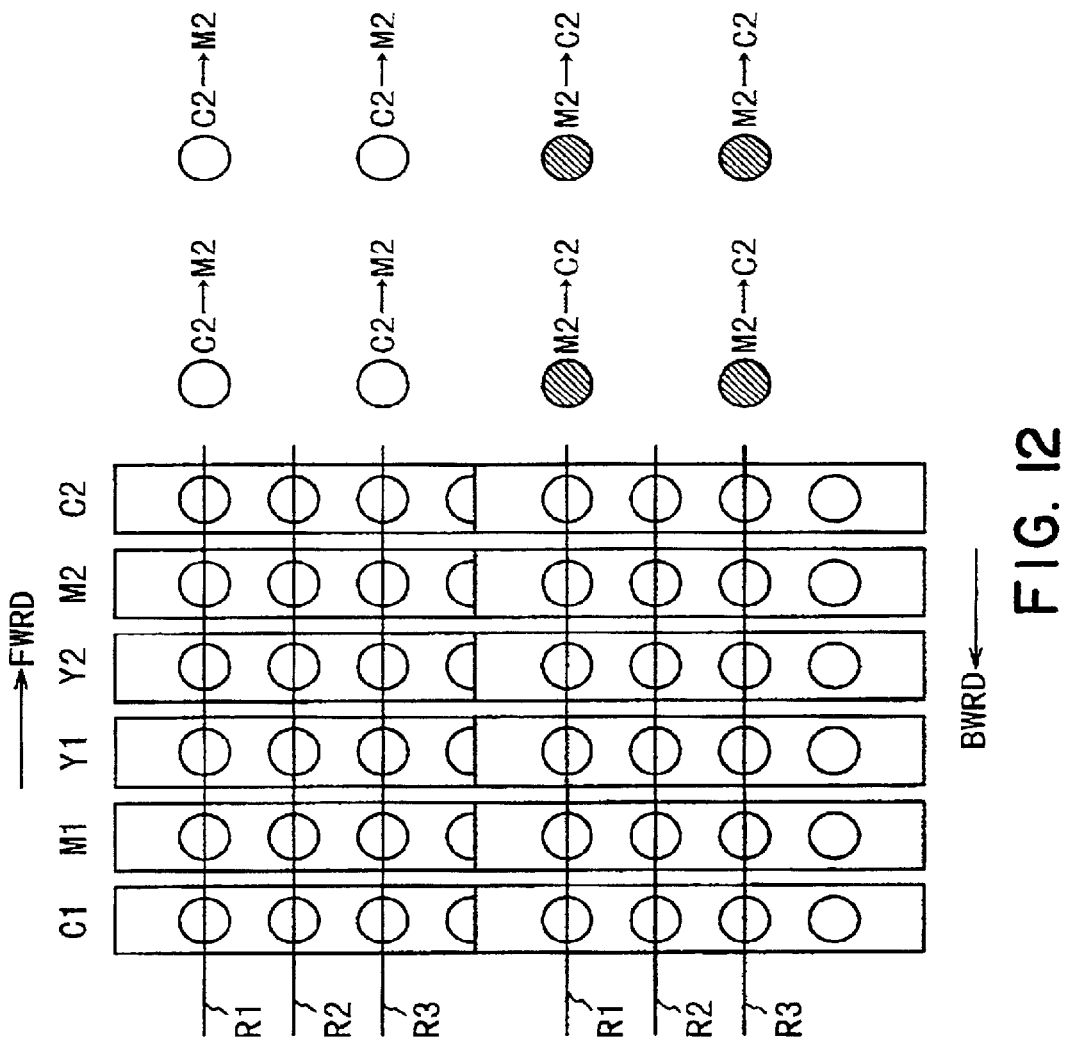
FIG. 12 shows the correlations between the recording data and the forward scanning of a recording medium in the primary scanning direction, and between the recording data and the backward scanning of the recording medium in the primary scanning direction, in a conventional recording method.

In FIGS. 10, 11, there is shown a bi-directional print according to this embodiment of the present invention. In this embodiment, the distribution circuit 207 functions to allocate the dots for the data for each color as shown in FIG. 9. In FIG. 9, the dots are disposed at positions deviated in the main scan direction, but this is not limiting, and the dot-on-dot allotment or another deviation is usable.

FIG. 10 illustrates a bi-directional print in which the cyan and magenta data 01 are uniformly contained in a pixel for the method of this embodiment. In this case, the order of shots is reverse for each column having the data in the forward path and the backward path (C2 and then M2: and M1 and then C1), and therefore, the color reproduction is substantially uniform, macroscopically.

FIG. 11 illustrates a bi-directional print in which the cyan and magenta data 10 are uniformly contained in a pixel through the method of this embodiment. In this case, the order of shots is the same (symmetrical) in the forward path and the backward path, so that substantially uniform color reproduction is accomplished.

FIG. 8 shows a conventional example in which the used recording nozzle are synchronized by the synchronism between the recording data and the positions of the recording nozzle arrays in the bi-directional print. As will be understood from the Figure, when the blue (cyan plus magenta) is to be printed, the same orders of shots occur in the forward path printing and the backward path printing, and the color non-uniformity occurs in the form of bands extending in the scanning direction since the orders of shots are different.

Figure 13:
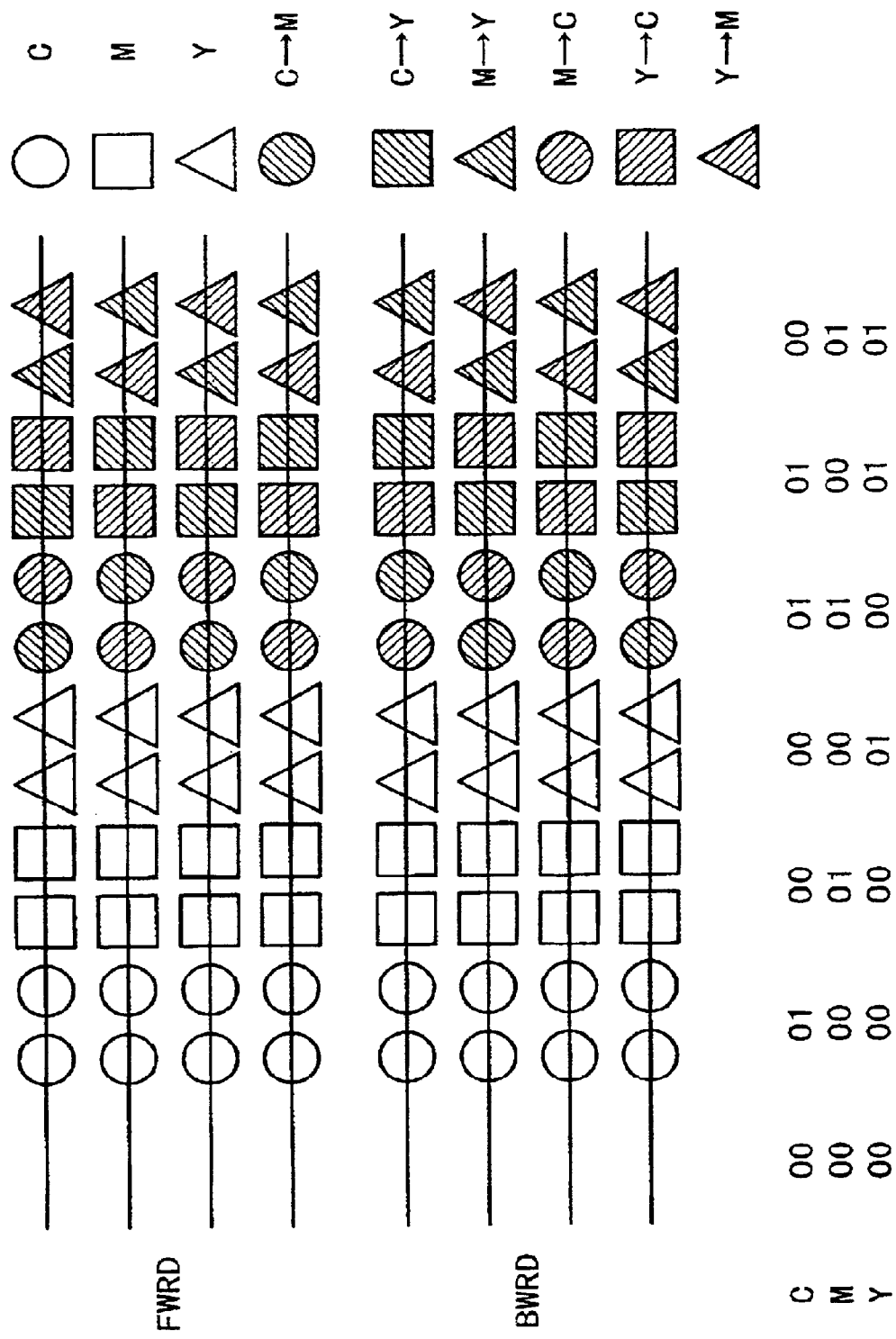
FIG. 13 is a schematic drawing for showing the gradation from primary colors, that is, yellow, magenta, and cyan colors, to secondary colors, in an image recorded on a recording medium.

FIG. 13 shows a color image formed on a recording material in the foregoing embodiment. The print schematically shows a gradation from each of monochromatic Y, M, C colors to secondary colors.

In a monochromatic pixel, the color non-uniformity attributable to the bi-directional printing does not arise in principle, but in this example, the secondary color pixels are printed in the orders which are different in the raster one direction, and therefore, the color non-uniformity attributable to the bi-directional printing is not macroscopically visible.

Next, the switching of the half-toning processes will be described. As described above, in the bit map data, the number of dots (0, 1, or 2) per pixel is presented by 2-bit data. In comparison, in text data or vector data, 1-bit data are generated per pixel to represent the number of dots (0, or 2) per pixel. This is for the following reason. That is, text data or vector data seldom effects half-tone, and therefore, the provision of 1-bit binary data usually. suffices. With this arrangement, a half-toning process can be increased in speed, and the amount of the data which must be handled by a host computer is halved, making it possible to substantially reduce the CPU load, memory capacity, and the like.

Here, for a primary color, two dots are placed per pixel. This is due to the fact that the apparatus was designed to effect a predetermined density by filling the area correspondent to each pixel by placing two dots per pixel. In other words, the apparatus was designed so that the amount of ink which is placed per pixel in accordance with 1-bit binary data becomes the same as the amount of ink which is placed per pixel to effect the maximum density in accordance with 2-bit multi-value data.

Although a two dot arrangement was employed here, whether one dot arrangement is better or two dot arrangement is better has only to be determined based on the ink absorbency of recording medium, and/or image properties such as the number of dots necessary for the image, that is, the number of dots necessary to effect desired density or to satisfactory reproduce solid portions of an image.

As a means for causing a recording head to eject ink in such a manner that the required number of ink dots are placed per pixel based on the data for each color, which have been put through 1-bit half-toning process, it is possible to consider putting the 1-bit data through a module, which converts the 1-bit data into such data that causes the recording head to eject ink droplets by the same number as the number of the dots necessary per pixel, and then, spooling the obtained data as raster data.

(Embodiment 2)

In the preceding embodiment, the switch between a multi-value half-toning process and a binary half-toning process is made based on image type. In this embodiment, a case in which the switch between the aforementioned two half-toning processes is made based on system speed will be described.

Here, the following factors are taken into consideration:
A) Speed (performance) of a host computer
B) Speed of an operating system
C) Speed of an image processing apparatuses
D) Difference between when a print mode in which printer speed is too fast for a host computer to generate toner gradation data with a higher number of levels, and a print mode in which printer speed is slow enough for a host computer to generate gradation data with a higher number of levels.

Of the above four factors, when the necessary data cannot be produced fast enough due to the difference in processing speed, or when the printing performance of a recording apparatus such as a printer substantially exceeds the processing capacity of the host equipment such as a computer, it is effective to carry out a binary half-toning process. The recording apparatus design may be such that printing data are generated in the form of a combination of various printing data; optimum printing data are automatically installed when a printer driver is installed; or a method considered best by a user is manually set.

Fundamentally, when a host computer and/or an operation system, which is relatively low in processing performance is in use, it is desired that image processing speed is increased by using 1-bit binary data instead of multi-value data such as 2-bit data.

In the case of a multifunctional recording apparatus having a copying function, a facsimile function, and the like, the switch may be made depending on whether the apparatus is used as a printer or a copying machine. This case is shown in FIG. 14.

Figure 14:
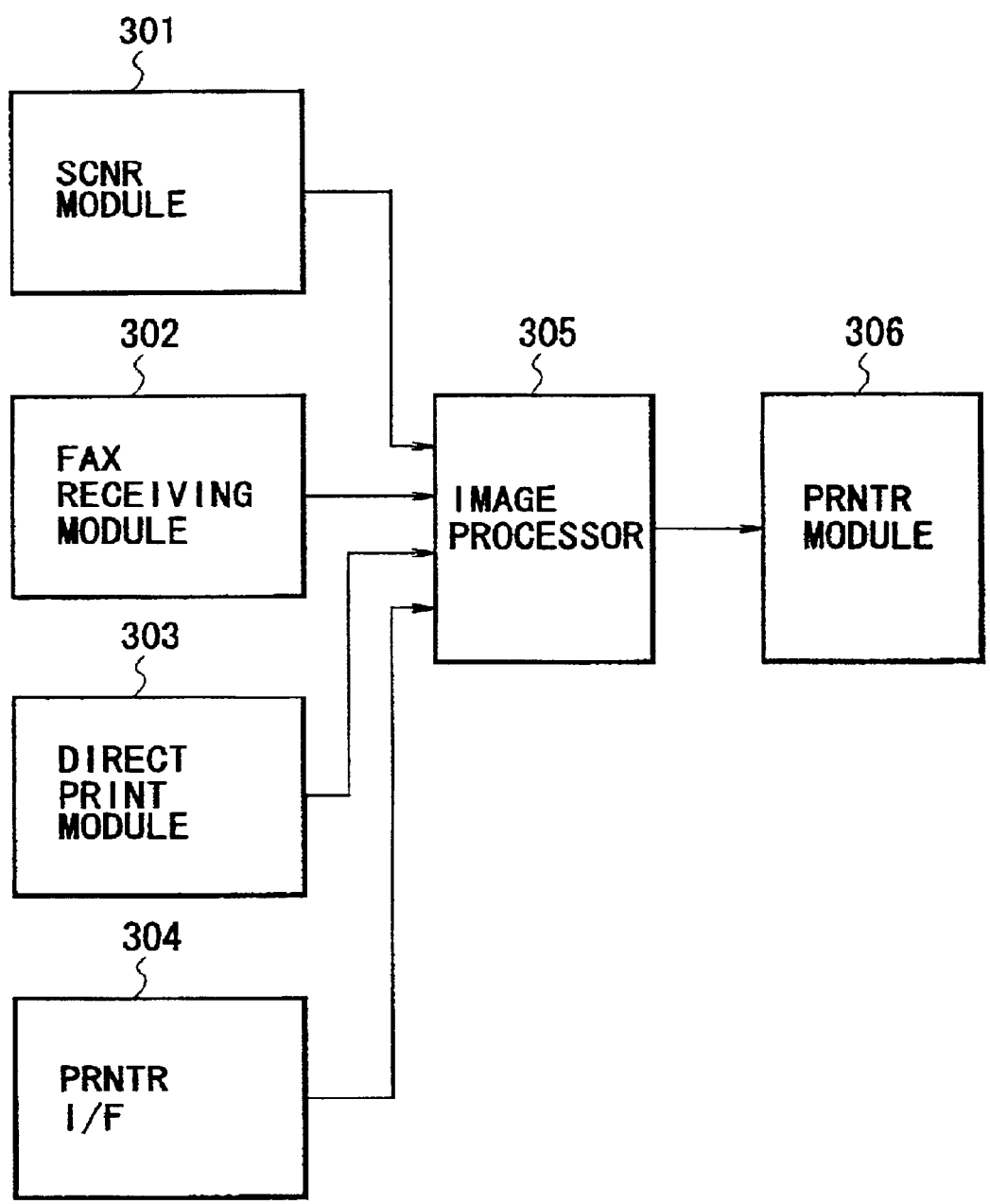
FIG. 14 is a block diagram for showing the functions of the recording apparatus in the second embodiment.

Referring to FIG. 14, the recording apparatus is provided with a scanner module 301 which includes a scanner for enabling the apparatus to function as a copying machine. It is also provided with a fax reception module 302, which includes a modem or the like, for enabling the apparatus to function as a facsimile machine. Further, it is provided with a direct print module 303, which includes a memory card adaptor or the like, for enabling the apparatus to function as a direct photo-printer. Obviously, it is provided with a printer interface 304 for enabling the apparatus to function as an ordinary printer.

A image processing means 305 inclusive of a printer driver selectively performs the above described multi-value half-toning process and binary half-toning process. In the case in which the amount of the data to be stored becomes massive unless the data are swiftly effected into images by increasing image processing speed, in the case in which the usage of multi-value data makes massive the amount of the data to be stored in the page memory, and/or in the case in which an original image itself is low in resolution or the like, and therefore, it is unnecessary to process the data for realizing high resolution and a large number of toner gradation levels, binary half-toning process is selected. As described above, in this embodiment, binary half-toning process is selected when the scanner module, a fax module, or direct print module, is used.

As for the switch which depends on the print mode, it is possible to consider making the switch depending on whether a multi-pass print mode (multi-value half-toning process) is used or a single pass print mode (binary half-toning process) is used, whether a bidirectional printing mode (binary half-toning process) is used or a unidirectional print mode (multi-value half-toning process) is used, or the like situation.

The selection of the half-toning process may be automatically made by a printing system, or may be made by a user and manually inputted by the user.

(Embodiment 3)

In this embodiment, the selection regarding the half-toning process is made depending on image type and system speed. In other words, this embodiment is a combination of the first and second embodiments.

Even if an operation system and/or a host computer is low in performance, 2-bit multi-value data are used for a bit map image, for example, a photographic image. In other words, the method in this embodiment is suitable to be used when a user wants to record an image superior in tone gradation, or in the like situation. It is useful when processing the data of a document, that is, an original, which contains both a photographic image, that is, a bit map image, and a text.

In the second embodiment, when the copying function (scanner module) is used, the binary half-toning process was selected, as described above. However, when the scanner module is high in resolution, the multi-value half-toning process may be selected to record an image superior in tone gradation. Similarly, the multi-value half-toning process may be selected when the faxing function is used, provided that the scanner module is high in resolution. On the contrary, depending upon the operation system type or host computer type, the binary value-tone process may be selected even when a printer interface is used.

With the use of the above described recording methods, even when the amount of the data to be processed is reduced based on the image type or system type, it is possible to generate data most suitable to be used with a symmetrical recording head. Further, when text or vector data are used, a half-toning means such as systematic dithering means which is faster in process speed is employed for half-toning, whereas when bit map data are used, an error dispersion method or the like which is relatively slow in process speed, but is superior in image quality, is employed. Thus, the overall data processing speed is further increased.

The apparatus may be designed so that the selection of the half-toning process is automatically made by the printing system, or the selection can be made by a user and the selected half-toning processing method can be manually inputted by the user.

(Embodiment 4)

Figure 15:
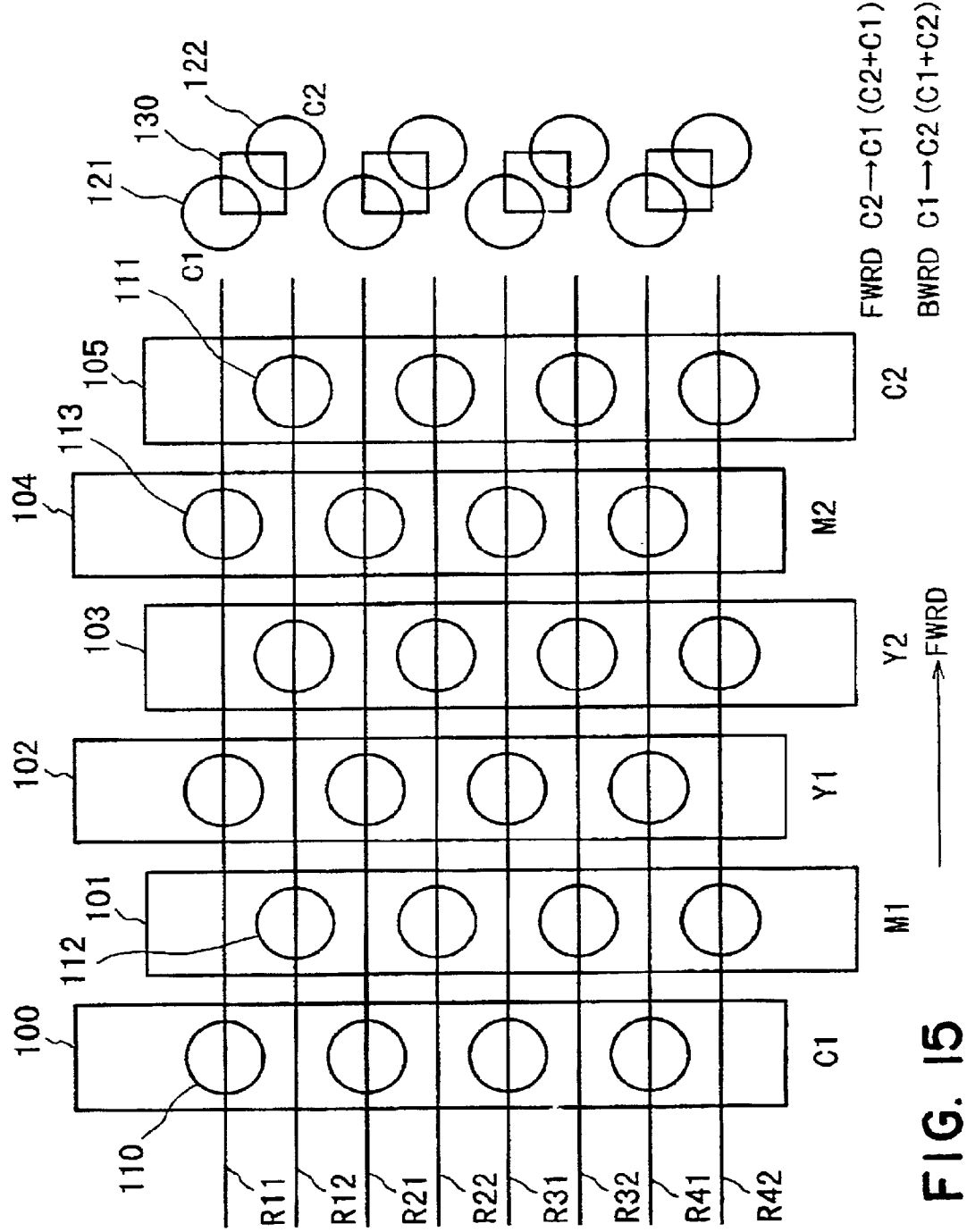
FIG. 15 is a schematic drawing for showing an example of the positioning of the ejection nozzles in the recording head, and the positional relationship between the ejection nozzles and pixels, in the fourth embodiment of the present invention.

FIG. 15 is a schematic view of a major part of a recording head portion of a head cartridge 1 according to another embodiment of the present invention. In this Figure, the constituent-elements are the same as the constituent-elements of the recording head portion shown in FIG. 3. However, the structure of the recording head portion used in this embodiment is different in that pair of the recording heads for the same color for a pixel for each color is deviated relative to the pitch of the nozzles of the recording head by ½ pitch in the sub-scan direction.

With this structure, the Figure shows the case in which the primary color (cyan) is printed.

The printing the defective with a pair of two dots at a dot position 121 and a dot position 122 to provide the maximum pixel density for the pixel 130. The dot position 121 and the dot position 122 in the Figure are the positions allotted to the dot ejected from the ejection nozzle 110 of the recording head 100C1 and the dot ejected from the ejection nozzle 111 of the recording head 105C2 in the pixel (pixel) 130 area. Here, the dot position 121 is an upper left position of the diagonal line, and the dot position 122 is a lower right position thereof. Designated by R11, R12 are main-scanning lines for forming a pixel 130 (raster line). In this example, one pixel is printed by 2 raster lines.

Figure 16:
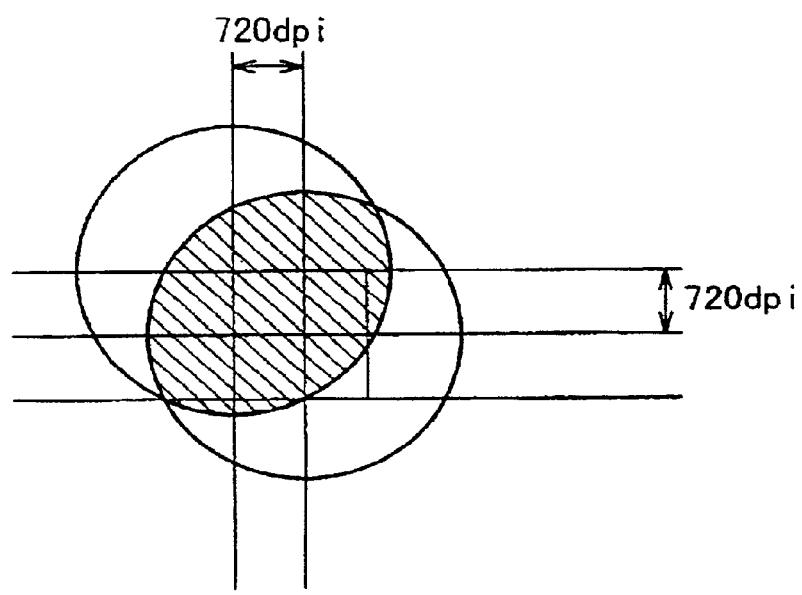
FIG. 16 is a drawing for showing the overlapping of the dots allotted to a given pixel.

In the forward path in which the head cartridge 1 moves in the direction indicated by an arrow in FIG. 15, the order of the shots to the pixel 130 is the recording head 105C2 and then 100C1, and in the backward path, the order is C1 and then C2. In the case of the primary color, the same color inks are deposited, and therefore, there occurs no difference in coloring due to the order of shots. In this Figure, the dot position 121 and the dot position 122 are not shown as being overlapped, but actually, as shown in FIG. 16, the dots are partly overlapped in normal situations.

Figure 17:
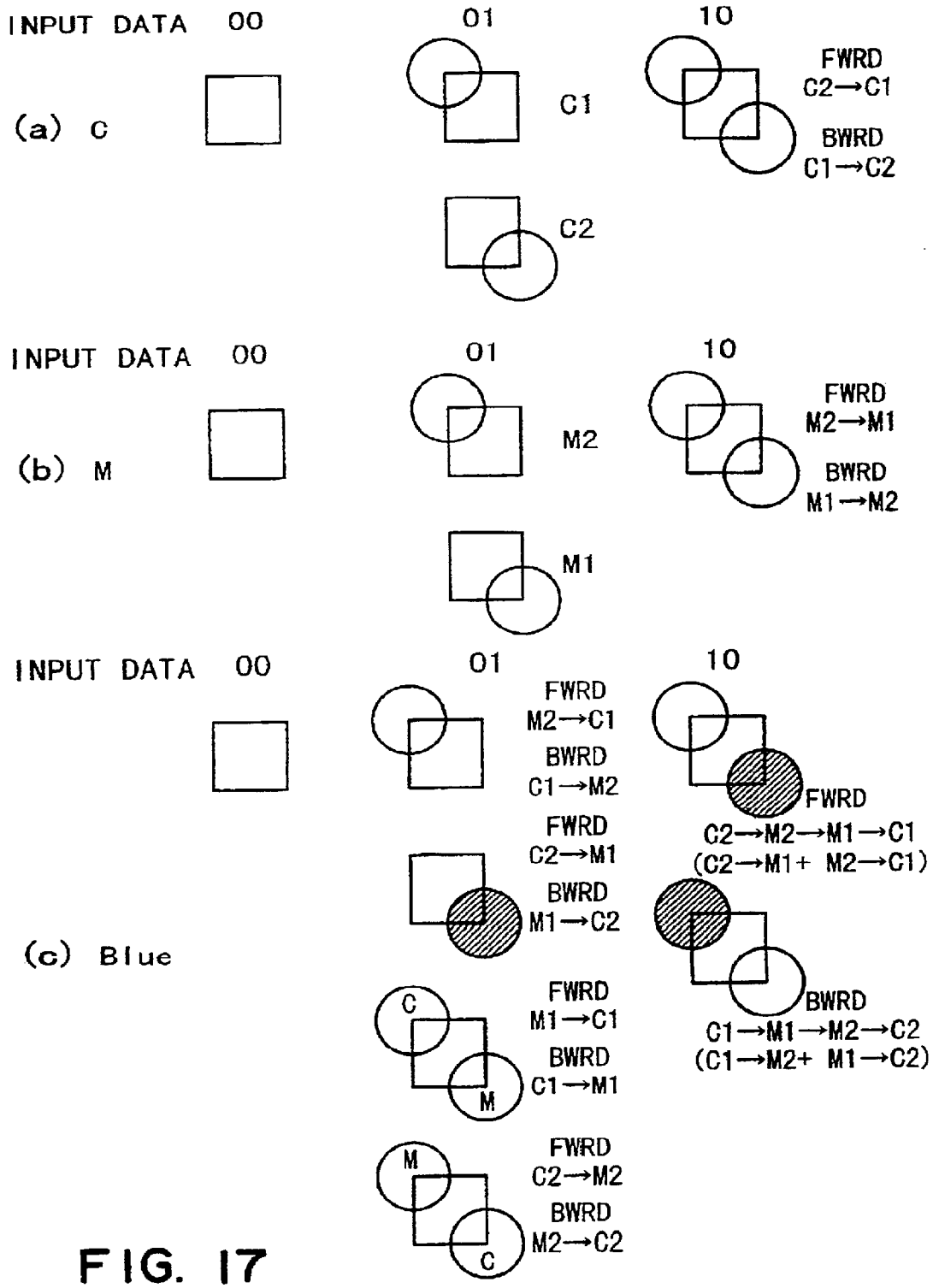
FIG. 17 is a drawing for showing the relationship between the inputted data and dot position, in the fourth embodiment.
Figure 18:
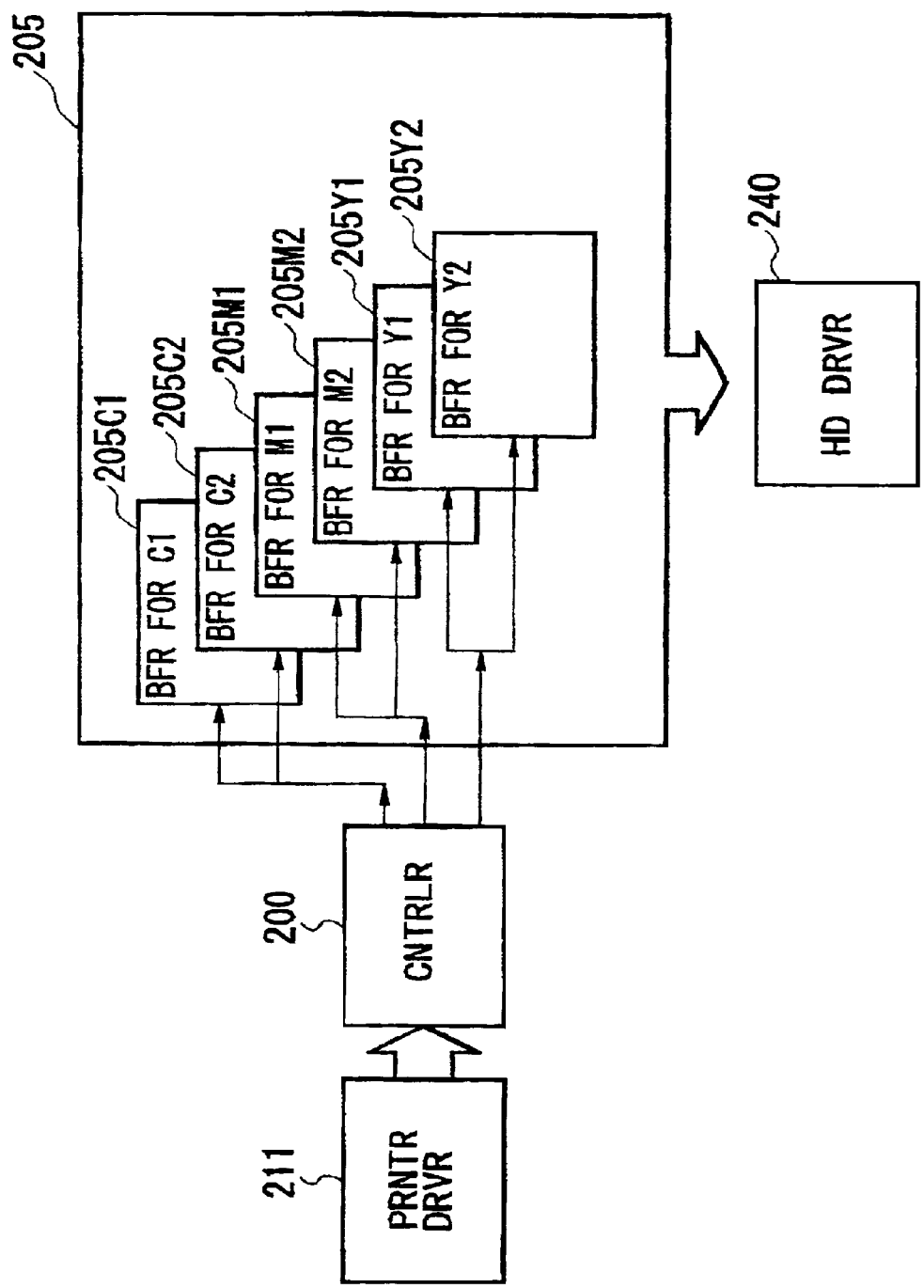
FIG. 18 is a block diagram for showing the structural arrangement of the recording apparatus in the fifth embodiment.

In this embodiment, the distribution circuit 207 having been described in the foregoing distributes or allots the data of respective colors to the dot positions, as shown in FIG. 17. The dot allocation of FIG. 18 is similar to FIG. 9, and therefore, the detailed description is omitted. As for the magenta (M) in FIG. 17, the arrangement of the recording heads M1, M2 is deviated by ½ dot pitch, and therefore, the head and dot positions are opposite from those of FIG. 9.

In FIG. 17, the blue dot allocations which is a secondary color of cyan plus magenta has been described, but the same applied to the yellow and the other secondary colors (green and red).

(Embodiment 5)

In the preceding embodiments, 1-bit data which had been put through the binary half-toning process were converted into 2-bit data, and two dot pairs were formed through the distribution of the thus obtained 2-bit data by the distribution circuit 207.

In this embodiment, 1-bit data which have been put through the binary half-toning process are sent, as they are, to a printer to form two dot pairs. As is evident from FIG. 18, which is a block diagram for showing the concept of this embodiment, the distribution circuit 207 is not provided in this embodiment. Instead, the controller 200 directly writes data into the print buffer 205.

In other words, the print controller 200 develops, as necessary, the image data supplied from the printer driver 211, into 1-bit data for each of cyan, magenta, and yellow colors, and writes them into the print buffer 205.

According to the half-toning method in this embodiment, the recording apparatus is structured so that when writing, for example, the 1-bit data for cyan, the 1-bit data are written in both the buffer 205C1 for the recording head 100C1 and the buffer 205C2 for the recording head 105C2. As the recording head reaches a specific point on a recording medium, which corresponds to a specific pixel, and where an ink dot or ink dots are placed to complete the pixel, the data in both buffers are read into the registers within the corresponding recording heads to print the image. With the provision of the above described relationship between the data and buffers, it is possible to place a two dot pair on a specific point of a recording medium correspondent to a sub-pixel, from different recording heads. Although in this embodiment, the above described arrangement is made with cyan, magenta, and yellow colors, it may be made with cyan, magenta, yellow, and black colors, or with other colors than those mentioned, which is obvious.

The 2-bit data which have been put through the multi-value half-toning process are written into the buffer 205 through the distribution circuit 207 shown in FIG. 7.

In this embodiment, the data which have been put through the binary half-toning process are transferred to a printer without being converted into 2-bit data. Therefore, the amount of the data to be transferred is smaller.

Although in this embodiment, the recording apparatus is configured so that the controller directly writes 1-bit data into the buffers, it may be configured so that the controller converts 1-bit data into 2-bit data as the bit conversion module does, and writes the converted data into the buffers through the distribution circuit.

As described above, according to the present invention, it is possible to generate or transfer print data while maintaining the operational load at a proper level, preventing a printing system from being subjected to an excessive amount of load.

Further, the probability that streaky color deviation patterns occurs due to the specific order in which a plurality of inks different in color must be ejected in order to carry out a bidirectional printing operation without overloading the system, can be reduced regardless of the type of image formation data.

While the invention has been described with reference to the structures disclosed herein, it is not confined to the details set forth and this application is intended to cover such modifications or changes as may come within the purposes of the improvements or the scope of the following claims.

What is claimed is:

1. A data processing method for generating print data to be supplied to a printing apparatus capable of multi-value recording, said method comprising:
    a multi-value conversion step of converting obtained image data to multi-value print data;
    a binarizing step of converting the obtained image data to binary print data;
    a selection step of selecting either one of said multi-value conversion step and said binarizing step in accordance with a condition;
    a changing step of changing an order of application of the different color inks to be applied for formation of secondary color in a pixel area of secondary color using a changing means; and
    a forming step of forming the secondary color using a forming means while making the order of applications of the inks to at least one of a plurality of the secondary color pixel areas arranged along a raster scan direction different from the order of another by said changing means;
    wherein said printing apparatus is capable of forming a color image by application of different color inks onto a print medium while scanningly moving a recording head thereof bi-directionally; and
    wherein the secondary color is formed on the basis of the multi-value print data provided by said multi-value conversion step.

2. The data processing method according to claim 1, wherein said multi-value conversion step effects its converting operation through a half-tone processing using an error diffusion method.

3. The data processing method according to claim 1, wherein said binarizing step effects its converting operation through a half-tone processing using a dither method.

4. The data processing method according to claim 1, further comprising a combining step of combining the print data provided by said multi-value conversion step and the print data provided by said binarizing step to generate the print data to be supplied to said printing apparatus.

5. The data processing method according to claim 1, further comprising a bit converting step of making the number of bits of the binary print data provided by said binarizing step equal to the number of bits of the multi-value print data provided by said multi-value conversion step.

6. The data processing method according to claim 1, wherein said selection step selects either one of said multi-value conversion step and said binarizing step in accordance with a nature of the obtained image data.

7. The data processing method according to claim 6, wherein said selection step selects said multi-value conversion step when the obtained image data are bit map data.

8. The data processing method according to claim 7, wherein said selection step selects said binarizing step when the obtained image data are text data or vector data.

9. The data processing method according to claim 1, wherein said selection step selects either one of said multi-value conversion step and said binarizing step in accordance with a nature of an operating system of a host computer.

10. The data processing method according to claim 1, wherein said selection step selects either one of said multi-value conversion step and said binarizing step in accordance with a nature of an image processing device for generating the image data.

11. The data processing method according to claim 1, wherein said selection step selects either one of said multi-value conversion step and said binarizing step in accordance with a printing mode of said printing apparatus.

12. The data processing method according to claim 1, wherein said selection step selects either one of said multi-value conversion step and said binarizing step in accordance with at least two of the obtained image data, an operating system of a host computer, an image processing device for generating the image data and a printing mode of said printing apparatus.

13. The data processing method according to claim 1, wherein in order to make the application of a certain color ink of the different color inks to be applied to form a secondary color on a pixel area of the secondary color symmetrical relative to another color ink, said forming means forms the secondary color by a plurality of applications of the certain color ink to the pixel area, and wherein the secondary color is formed on the basis of the binary print data provided by said binarizing step.

14. The data processing method according to claim 1, further comprising a bit converting step of making the number of bits of the binary print data provided by said binarizing step equal to the number of bits of the multi-value print data provided by said multi-value conversion step, and converting the binary print data to the number of ink applications.

15. A printing apparatus capable of multi-value recording on the basis of multi-value print data supplied thereto, said apparatus comprising:
   discriminating means for discriminating whether the data supplied to said printing apparatus is binary or not;
   bit converting means for making, when the supplied print data are binary, the number of bits of the binary print data equal to the number of bits of the multi-value print data.

16. A printing apparatus capable of forming a color image by application of different color inks onto a print medium while scanningly moving a recording head thereof bi-directionally, said apparatus comprising:
   changing means for changing an order of application of the different color inks to be applied for formation of secondary color in a pixel area of secondary color;
   forming means for forming the secondary color while making the order of applications of the inks to at least one of a plurality of the secondary color pixel areas arranged along a raster scan direction different from the order of another, by said changing means; and
   bit converting means for making, when the supplied print data are binary, the number of bits of the binary print data equal to the number of bits of the multi-value print data.

17. The printing apparatus according to claim 16, wherein in order to make the application of a certain color ink of the different color inks to be applied to form a secondary color on a pixel area of the secondary color symmetrical relative to another color ink, said forming means forms the secondary color by a plurality of applications of the certain color ink to the pixel area, and wherein the secondary color is formed on the basis of the binary print data provided by said binarizing step.

18. A printing apparatus for forming a color image by application of different color inks onto a print medium while scanningly moving a recording head thereof bi-directionally, said apparatus comprising:
   first forming means for changing an order of application of the different color inks to be applied for formation of secondary color in a pixel area of secondary color and forming the secondary color while making the order of applications of the inks to at least one of a plurality of the secondary color pixel areas arranged along a raster scan direction different from the order of another, by said changing means; and
   second forming means for changing an order of application of the different color inks to be applied for formation of secondary color in a pixel area of secondary color and forming the secondary color while making the order of applications of the inks to at least one of a plurality of the secondary color pixel areas arranged along a raster scan direction different from the order of another, by said changing means; and
   control means for forming the secondary color by said first forming means when the supplied print data are multi-value data, and forming the secondary color by said second forming means when the print data are binary data.

19. The printing apparatus according to any one of claims 15–18, wherein said recording head ejects the ink by heat.

20. A printing method capable of multi-value recording on the basis of multi-value print data supplied thereto, the improvement residing in:
   a bit converting step of making, when the supplied print data are binary data, the number of bits of the binary print data provided by said binarizing step equal to the number of bits of the multi-value print data provided by said multi-value conversion step.

21. A printing method capable of forming a color image by application of different color inks onto a print medium while scanningly moving a recording head thereof bi-directionally, said method comprising:
   a changing step of changing an order of application of the different color inks to be applied for formation of secondary color in a pixel area of secondary color;
   a forming step of forming the secondary color while making the order of applications of the inks to at least one of a plurality of the secondary color pixel areas arranged along a raster scan direction different from the order of another, by said changing means; and
   a bit converting step of making, when the supplied print data are binary, the number of bits of the binary print data equal to the number of bits of the multi-value print data.

* * * * *

UNITED STATES PATENT AND TRADEMARK OFFICE
CERTIFICATE OF CORRECTION

PATENT NO. : 7,079,283 B2
APPLICATION NO. : 09/966251
DATED : July 18, 2006
INVENTOR(S) : Naoji Otsuka et al.

It is certified that error appears in the above-identified patent and that said Letters Patent is hereby corrected as shown below:

ON COVER PAGE AT (*) NOTICE

"This patent is subject to a terminal disclaimer." should be deleted.

ON COVER PAGE AT (30) FOREIGN APPLICATION PRIORITY DATA

"2000/300185" should read --2000-300185--.

COLUMN 2

Line 17, "use independent two" should read --using two independent--;
Line 35, "print" should read --printed--;
Line 36, "provide" should read --provides--; and
Line 63, "above" should read --above- --.

COLUMN 4

Line 38, "above described" should read --above-described--;
Line 53, "to" should read --for--;
Line 54, "patter" should read --pattern--; and
Line 58, "one of" should read --one or--.

COLUMN 6

Line 20, "above described" should read --above-described--;
Line 41, "nozzle," should read --nozzles,--;
Line 44, "has" should read --has been--; and
Line 65, "ink" should read --inks--.

COLUMN 7

Line 27, "covert" should read --convert--; and
Line 44, "to" should read --with--.

COLUMN 8

Line 55, "these" should read --this--; and
Line 59, "wording" should read --working--.

UNITED STATES PATENT AND TRADEMARK OFFICE
CERTIFICATE OF CORRECTION

PATENT NO. : 7,079,283 B2
APPLICATION NO. : 09/966251
DATED : July 18, 2006
INVENTOR(S) : Naoji Otsuka et al.

It is certified that error appears in the above-identified patent and that said Letters Patent is hereby corrected as shown below:

COLUMN 9

Line 7, "sensors 234" should read --sensor 234--;
Line 17, "(election" should read --(ejection--;
Line 37, "first recording heading" should read --ejecting--; and
Line 42, "(M2)" should read --(C2)--.

COLUMN 10

Line 60, "cyan." should read --cyan head.--; and
Line 66, "are" should be deleted.

COLUMN 11

Line 4, "the M1" should read --M1--;
Line 15, "present" should read --the present--;
Line 18, "and" should be deleted;
Line 45, "he" should be deleted;
Line 47, "write" should read --writes--;
Line 58, "used" should read --use--; and
Line 61, "becomes" should read --become--.

COLUMN 12

Line 52, "be" should be deleted.

COLUMN 13

Line 15, "In the Figure, (b)," should read --The Figure (b)--.

COLUMN 14

Line 15, "nozzle" should read --nozzles--; and
Line 62, "satisfactory" should read --satisfactorily--.

COLUMN 15

Line 14, "apparatuses" should read --apparatus--; and
Line 54, "above described" should read --above-described--.

UNITED STATES PATENT AND TRADEMARK OFFICE
CERTIFICATE OF CORRECTION

PATENT NO. : 7,079,283 B2
APPLICATION NO. : 09/966251
DATED : July 18, 2006
INVENTOR(S) : Naoji Otsuka et al.

It is certified that error appears in the above-identified patent and that said Letters Patent is hereby corrected as shown below:

COLUMN 16

Line 21, "above described" should read --above-described--;
    Line 59, "that pair" should read --that a pair--; and
    Line 65, "The printing the defective" should read --Printing is effected--.

COLUMN 17

Line 28, "applied" should read --applies--;
    Line 57, "above described" should read --above-descibed--; and
    Line 61, "above described" should read --above-descibed--.

Signed and Sealed this

Thirteenth Day of February, 2007

JON W. DUDAS
*Director of the United States Patent and Trademark Office*